United States Patent
Sone et al.

(10) Patent No.: US 6,914,245 B2
(45) Date of Patent: Jul. 5, 2005

(54) INFRARED LIGHT DETECTION ARRAY AND METHOD OF PRODUCING THE SAME

(75) Inventors: Takanori Sone, Tokyo (JP); Osamu Kaneda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 389 days.

(21) Appl. No.: 10/286,919

(22) Filed: Nov. 4, 2002

(65) Prior Publication Data

US 2003/0111603 A1 Jun. 19, 2003

(30) Foreign Application Priority Data

Dec. 13, 2001 (JP) ........................................ 2001-380068

(51) Int. Cl.[7] .................................................. G01J 5/00
(52) U.S. Cl. .................................. 250/338.1; 250/336.1
(58) Field of Search ............................ 250/338.1, 336.1

(56) References Cited

U.S. PATENT DOCUMENTS 5,844,238 A * 12/1998 Sauer et al. ................ 250/332
6,069,359 A * 5/2000 Imada et al. ............. 250/338.3
6,080,988 A   6/2000 Ishizuya et al.
6,469,301 B1 * 10/2002 Suzuki et al. ............ 250/338.1

FOREIGN PATENT DOCUMENTS

JP          10-253447       9/1998
JP          2000-326299     11/2000

* cited by examiner

Primary Examiner—David Porta
Assistant Examiner—Christine Sung
(74) Attorney, Agent, or Firm—Leydig, Voit & Mayer, Ltd.

(57) ABSTRACT

An infrared light detection array with a plurality of infrared light detectors, said infrared light detectors each comprising: a supporting leg fixed to said substrate at one end, having a laminated structure of an insulation layer and a wiring layer; and a heat insulation structure portion supported by said supporting leg, comprising an insulation layer having a first surface to serve as a surface of incidence for infrared light to impinge on and a second surface to serve as a surface of incidence for reading light to impinge on, a reflection film which is formed on said second surface of said insulation layer, and a resistor connected with said wiring layer, and as said supporting legs heated up to a detection temperature by said infrared light reversibly warp, said infrared light detectors change the reflection direction of said reading light impinging upon said reflection films.

18 Claims, 21 Drawing Sheets

Region A ← → Region B

INFRARED LIGHT DETECTION ARRAY AND METHOD OF PRODUCING THE SAME

CROSS-REFERENCE TO RELATED APPLICATIONS

A related patent application is a commonly assigned Japanese Patent Application No. 2001-380068 filed on Dec. 13, 2001, which is incorporated by reference into the present patent application.

BACKGROUND OF THE INVENTION

1. Field of the Invention

The present invention relates to an infrared light detection array and a method of Producing the same, and more particularly, to an infrared light detection array having infrared light detectors correctable supporting angles of heat insulation structure portions and a method of Producing the same.

2. Description of the Related Art

FIG. 22 is a cross sectional view of an infrared light detector indicated in its entirety by 700 and described in JP, 10-253447, A. The infrared light detector 700 includes a semiconductor substrate 701. A support leg 702 is disposed on the semiconductor substrate 701. Further, one end of a displaceable portion 705 is fixed to the supporting leg 702, and the displaceable portion 705 is supported in midair. The displaceable portion 705 has a laminated structure of an infrared absorbing film 703 and a reflection film 704.

In the infrared light detector 700, as infrared light impinges upon the displaceable portion 705, the infrared absorbing film 703 absorbs the infrared light and converts the light into heat. Since thermal expansion coefficients of the infrared absorbing film 703 and the reflection film 704 forming the displaceable portion 705 are different from each other, if the displaceable portion 705 is heated, the displaceable portion 705 warps in accordance with the bi-material principle.

As the displaceable portion 705 warps, the reflection angle of reading light irradiating upon the reflection film 704 changes. Hence, as this change is detected as a change in reflection intensity at a predetermined detection position, the incident infrared light is detected.

Meanwhile, JP, 2000-326299, A as well describes an infrared light detector having an approximately same structure utilizing the bi-material principle.

In an infrared light detection array with such infrared light detectors 700 arranged each as one pixel, even if uniform infrared light is irradiated upon all pixels, the reflection intensities of reading light do not become uniform since the angles of the reflection films 704 with respect to the semiconductor substrate 701 are not uniform among the pixels. Hence, there is a problem that the intensities of reflected reading light are not uniform and an image deterioration called a fixed pattern noise is created. Further, there is another problem that even when the quantity of infrared light incident upon the infrared light detectors 700 is changed, the angles of the reflection films 704 do not similarly change among all pixels.

Although a method according to dispose interference of reading light for each pixel so as to reduce variations among the pixels has been proposed to solve these problems, it is difficult to ensure that an interference condition is constant among all pixels, and therefore, it is impossible to remove a fixed pattern noise.

Meanwhile, other method has been proposed to have a CCD camera or the like capture reflection light of reading light and to electrically correct an imaging signal. However, although realizing removal of a fixed pattern noise, this method demands a camera, a signal correction circuit, etc., and therefore, there is a problem that a cost for a detection system including infrared light detectors is very high.

SUMMARY OF THE INVENTION

The object of the present invention is providing an infrared light detection array including a plurality of infrared light detectors to be able adjust the supporting angles of displaceable portions of the respective infrared light detectors and remove a fixed pattern noise.

The present invention is directed to an infrared light detection array with a plurality of infrared light detectors arranged on a substrate in the form of a matrix. The infrared light detectors each includes: a) a supporting leg fixed to the substrate at one end, having a laminated structure of an insulation layer and a wiring layer; b) a heat insulation structure portion supported by the supporting leg, including an insulation layer having a first surface to serves as a surface of incidence for infrared light to impinge upon and a second surface to serve as a surface of incidence for reading light to impinge upon, a reflection film formed on the second surface of the insulation layer, and a resistor connected with the wiring layer. As the supporting legs heated up to a detection temperature by the infrared light reversibly warp, the infrared light detectors change the direction of reflecting reading light impinged upon the reflection films. The supporting legs non-reversibly warp, as the resistors carry a current through the wiring layers and the supporting legs are heated up to a temperature higher than the detection temperature.

The present invention is also directed to a method of producing an infrared light detection array with a plurality of infrared light detectors arranged on a substrate in the form of a matrix. The method includes: a step of preparing a substrate; a step of depositing a sacrificial layer on the substrate; a step of forming insulation layers with defined heat insulation structure portion areas and defined supporting leg areas, on the sacrificial layer; a resistor forming step of forming resistors in the heat insulation structure portion areas of the insulation layers; a reflection film forming step of forming reflection films on the resistors; an annealing step of heating the substrate equipped with the reflection films to a predetermined annealing temperature; a step of forming a wiring layer connected with the resistors on the supporting leg areas of the insulation layers after the annealing step; and a step of removing the sacrificial layer and manufacturing the infrared light detectors with the heat insulation structure portions supported on the substrate by the supporting legs composed of the insulation layers and the wiring layers. The method further includes a correction step of causing the resistors included in the infrared light detectors to carry a current after the infrared light detectors are formed and heating up the resistors to a temperature lower than the annealing temperature, so that the supporting legs non-reversibly warp and the supporting angles of the reflection films with respect to the substrate become approximately uniform among all of the infrared light detectors.

DETAILED DESCRIPTION OF THE PREFERRED EMBODIMENTS

First Preferred Embodiment

Figure 1:
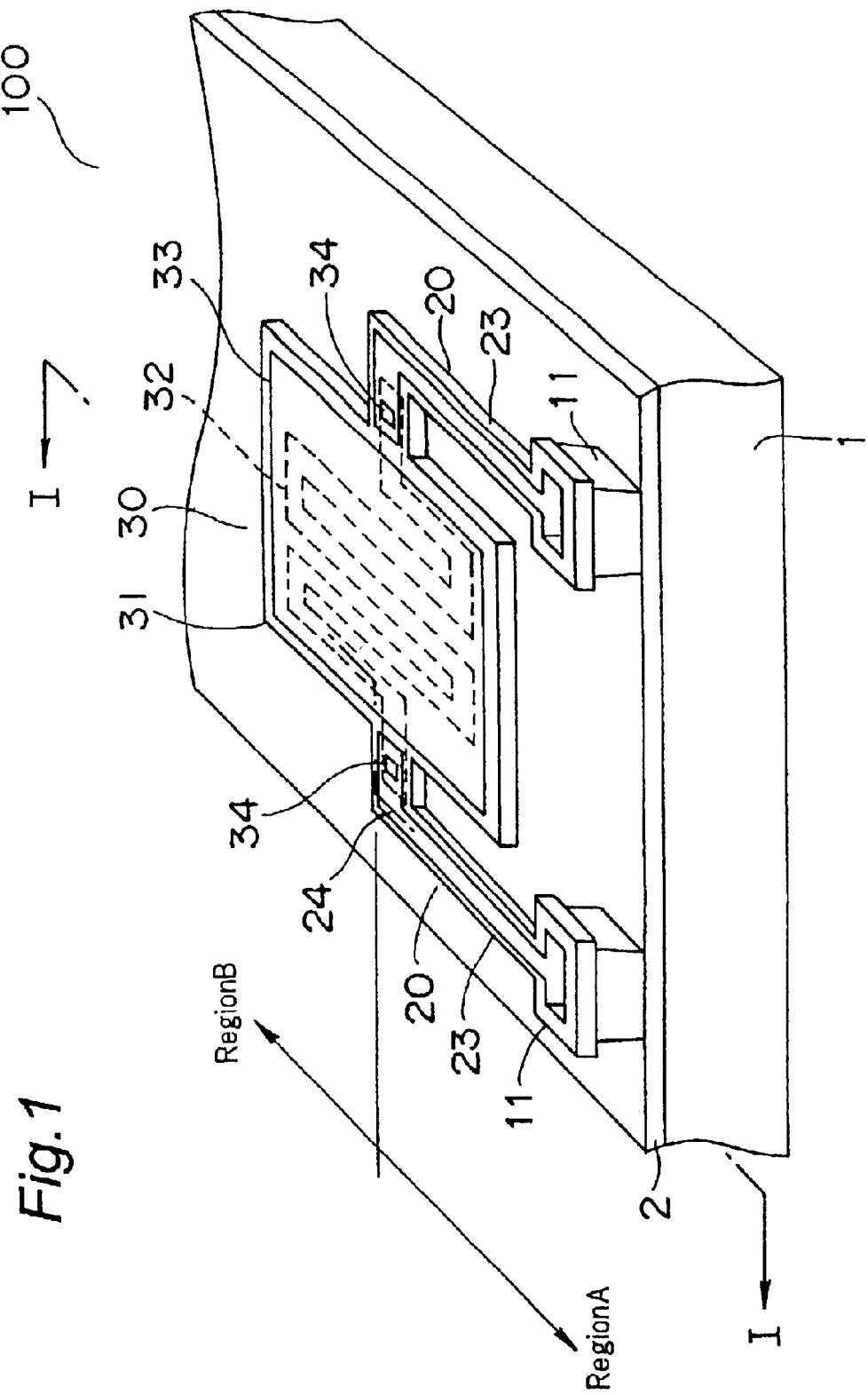
FIG. 1 is a perspective view of the infrared light detector according to the first preferred embodiment of the present invention.

FIG. 1 is a perspective view of an infrared light detector (corresponding to one pixel) indicated in its entirety by 100 and included in an infrared light detection array according to a first preferred embodiment.

The infrared light detector 100 includes a silicon substrate 1. The top surface of the silicon substrate 1 is covered with a silicon oxide film 2. Disposed on the silicon oxide film 2 is a supporting leg 20 fixed by two supporting portions 11 to the silicon substrate 1 and a heat insulation structure portion 30 supported by two supporting leg 20 in midair.

The supporting leg 20 has a double-layer structure of an insulation layer 23 of silicon oxide and an aluminum wiring layer 24, and the aluminum wiring layer 24 serves also as an electric wire.

The heat insulation structure portion 30 includes a silicon oxide layer 31 and a resistor 32 disposed in the silicon oxide layer 31. Although not visible from outside, the resistor 32 is disposed in a meandering shape (zigzag shape) as denoted at the dotted line in FIG. 1. A reflection film 33 of aluminum is disposed on the top surface of the heat insulation structure portion 30.

The resistor 32 is connected to the aluminum wiring layer 24 of the supporting leg 20 by a contact portion 34. Further, the aluminum wiring layer 24 of the supporting leg 20 is electrically connected with a circuit (not shown) disposed in the silicon substrate 1 by supporting portions 11 of the supporting leg 20.

A method of detecting infrared light using the infrared light detector 100 will now be described.

Infrared light impinges upon the infrared light detector 100 from below the silicon substrate 1. This increases the temperature of the heat insulation structure portion 30, and further, the temperature of the support leg 20. The insulation layer 23 and the aluminum wiring layer 24 forming the supporting leg 20 are different in terms of thermal expansion coefficient from each other. Hence, as the temperature of the supporting leg 20 increased, the supporting leg 20 warps and gets deformed due to the bi-material principle. As a result, the supporting angle of the heat insulation structure portion 30 (i.e., the angle between the silicon substrate 1 and the heat insulation structure portion 30) changes.

Reading light impinges upon the heat insulation structure portion 30 from above and is reflected by the reflection film 33. As the supporting angle of the heat insulation structure portion 30 changes, the reflection direction of the reflection light changes. Hence, detection of the reflection light intensity at a predetermined detection position allows detecting the quantity of the infrared light irradiated upon the heat insulation structure portion 30.

Figure 2:
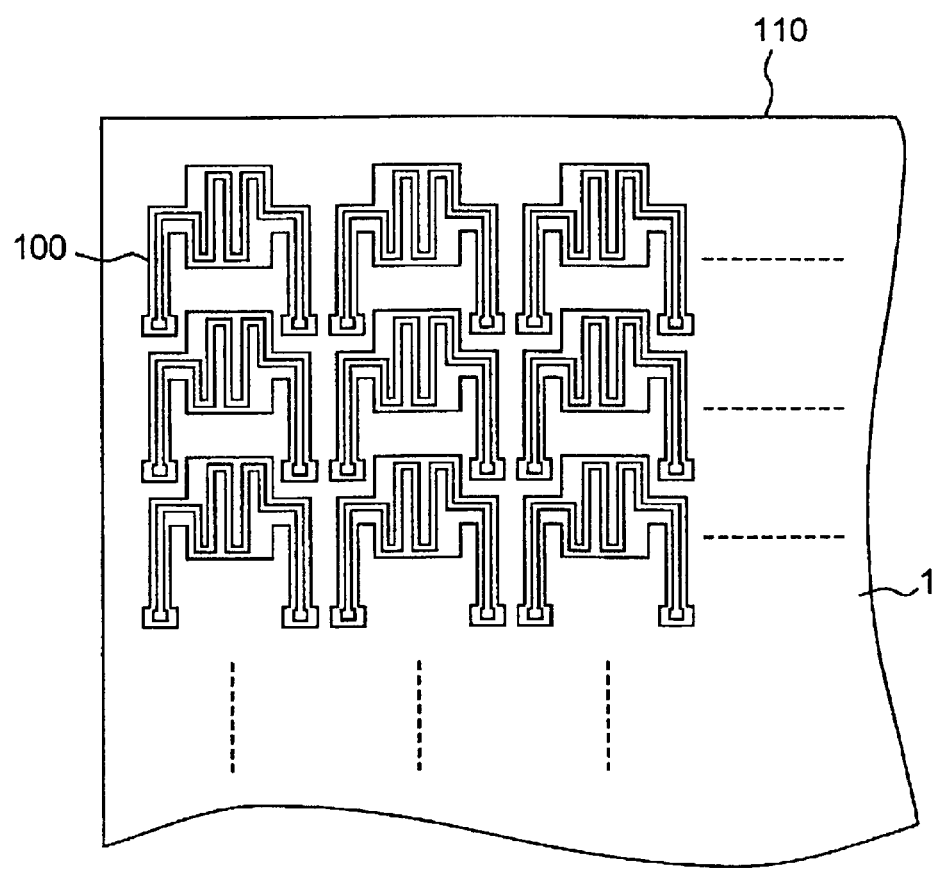
FIG. 2 is a top view of the infrared light detection array according to the first preferred embodiment of the present invention.

FIG. 2 is a schematic view of the infrared light detection array according to the first preferred embodiment indicated in its entirety by 110. The infrared light detection array 110 includes a plurality of the infrared light detectors 100, and each infrared light detector 100 forms a pixel of the infrared light detection array 110. More specifically, 128 infrared light detectors (pixels) 100 are arranged in the vertical direction and 128 infrared light detectors (pixels) 100 are arranged in the horizontal direction on the silicon substrate 1. In FIG. 2, the infrared light detectors 100 are schematically illustrated.

Figure 3:
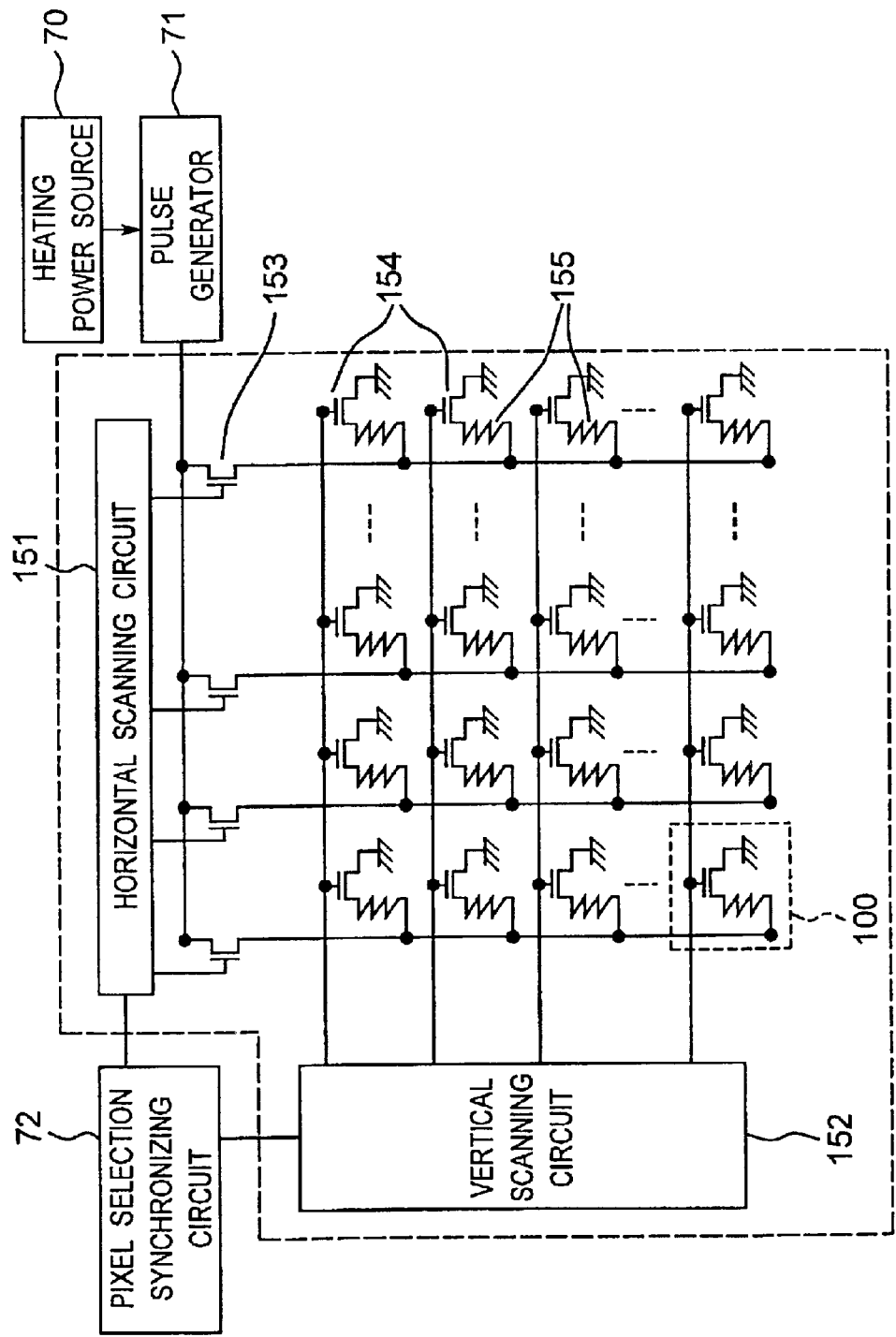
FIG. 3 is a circuit diagram of the infrared light detection array according to the first preferred embodiment of the present invention.

FIG. 3 is a circuitry diagram of the infrared light detection array 110 shown in FIG. 2. In FIG. 3, the area enclosed by the dotted line shows a circuit contained in the infrared light detection array 110, and the other area shows circuits disposed outside the infrared light detection array 110.

The circuit within the infrared light detection array 110 includes a plurality of the infrared light detectors (pixels) 100. The both ends of the aluminum wiring layers 24 of the infrared light detectors (pixels) 100 are connected with a horizontal scanning circuit 151 and with a vertical scanning circuit 152 via pixel switching transistors 154. The horizontal scanning circuit 151 and the vertical scanning circuit 152 are connected with a pixel selection synchronizing circuit 72 disposed outside. These connections are established through pad electrodes (not shown) for instance disposed to the infrared light detection array 110.

In such a circuit, the pixel selection synchronizing circuit 72 drives the horizontal scanning circuit 151 and the vertical scanning circuit 152 so that a row and a column in the infrared light detection array are selected. In the selected infrared light detection array, a horizontal selection switching transistor 153 and the pixel switching transistor 154 are turned on, whereby a current flows from a heating power source 70 disposed outside through a pulse generator 71. The electrifying heats up a resistor component 155 of the pixel, and the temperature of the pixel accordingly increases.

The value of the flowing current is adjusted by the heating power source and the current-carrying time is adjusted by the pulse generator, so that the temperature increase at the pixel is controlled. While these wires and circuits are fabricated in the silicon substrate 1, since they block transmission of infrared light, it is desirable not to locate them immediately below the heat insulation structure portions.

A method of producing the infrared light detection array 110 according to the first preferred embodiment will now be described with reference to FIGS. 4A–4E. FIGS. 4A–4E are cross sectional views of FIG. 1 taken along the I—I direction. As denoted at the dotted line in FIG. 1, the cutting section is bent in mid course. That is, the cross sectional surfaces in the regions A and B along the I—I direction respectively correspond to the regions A and B in the cross section shown in FIGS. 4A–4E. In FIGS. 4A–4E, one infrared light detector 100 contained in the infrared light detection array 110 is illustrated. The producing method includes the following steps 1 through 5.

Figure 4A:
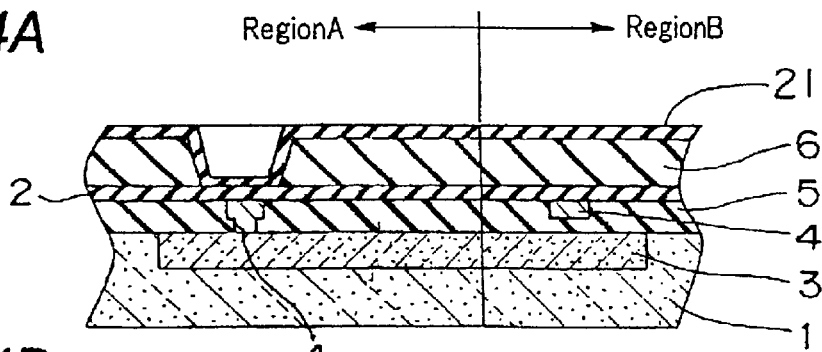
FIGS. 4A–4E are cross sectional views showing the steps of manufacturing the infrared light detection array according to the first preferred embodiment of the present invention.

Step 1: As shown in FIG. 4A, a circuit area 3 is formed within the silicon substrate 1. The circuit area 3 includes scanning circuits, switching transistors, etc., for selectively passing a current through the infrared light detectors (pixels). A circuit wiring 4 buried in a silicon oxide film 5 is formed on the circuit area 3. The circuit wiring 4 connects the circuit area 3 with the aluminum wiring layer 24 of the infrared light detector.

Next, a silicon oxide film (protection film) 2 of silicon oxide to cover the circuit wiring 4 is formed, and further, a sacrificial layer (spacer layer) 6 of polycrystalline silicon for instance is formed on the protection film 2.

Following this, the sacrificial layer 6 is etched at a predetermined position to be opened, and a silicon oxide film 21 is deposited. The silicon oxide film 21 is connected with the protection film 2 at the bottom surface of the opening. Etching of the sacrificial layer 6 is plasma etching using chloride gas plasma for example.

Figure 4B:
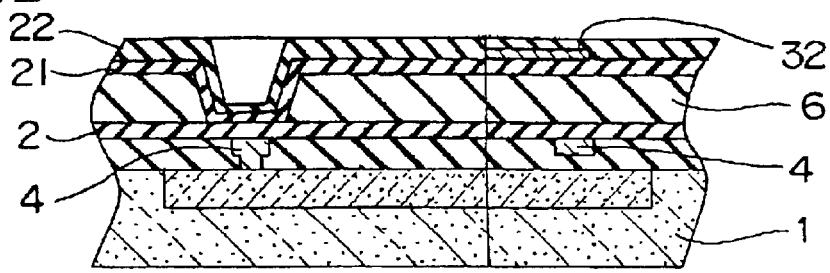

Step 2: As shown in FIG. 4B, titanium is deposited on the silicon oxide film 21, and through a photolithographic step and an etching step using chloride gas plasma, the resistor 32 is formed. As shown in FIG. 1, the resistor 32 is patterned into a meandering shape (zigzag shape).

Next, a silicon oxide film 22 is formed so as to cover the resistor 32. The silicon oxide film 22 in an area supposed to be the heat insulation structure portion is flattened by CMP.

Figure 4C:
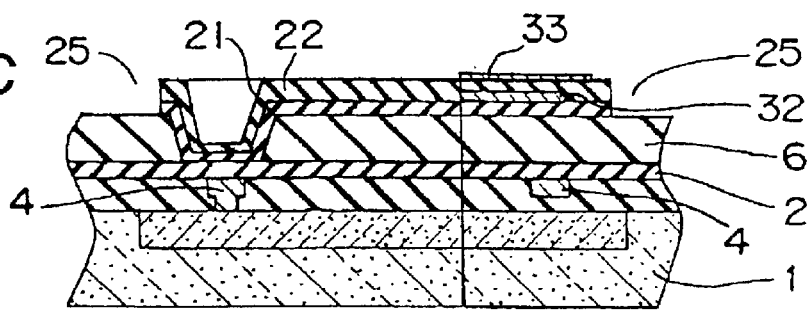

Step 3: As shown in FIG. 4C, after depositing an aluminum layer, through a photolithographic step and an etching step using chloride gas plasma, the reflection film 33 is formed almost entirely over the area supposed to be the heat insulation structure portion.

Following this, for the purpose of forming the supporting leg 20 and the heat insulation structure portion 30, through a photolithographic step and an etching step using methane trifluoride gas plasma, the silicon oxide film 21 and the silicon oxide film 22 are patterned. The patterning partially exposes the sacrificial layer 6. As etching gas is supplied through the portion where the sacrificial layer 6 is exposed so as to remove the sacrificial layer 6 at a later step, this exposed portion is called an etching hole 25.

Figure 4D:
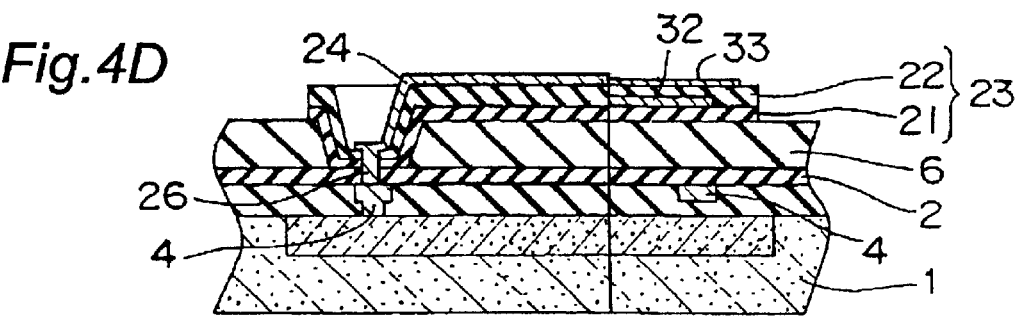

Step 4: As shown in FIG. 4D, at this stage, since fabrication of the heat insulation structure portion 30 is already complete, annealing is performed at a temperature of about 400° C. As a result of the annealing, the heat insulation structure portion 31 will not get non-reversibly deformed at a temperature of 400° C. or lower.

Next, through a photolithographic step and an etching step using methane trifluoride gas plasma, the contact portion 34 of the resistor 32 and a contact hole 26 are formed above the circuit wiring 4 (The contact portion of the resistor 32 is not shown in the drawing).

Following this, an aluminum layer is formed by sputtering at a room temperature. The aluminum layer is patterned through a photolithographic step and an etching step using chloride gas plasma, whereby the aluminum layer becomes the aluminum wiring layer 24 on the supporting leg 20. The aluminum wiring layer 24 is connected with the resistor 32 and the circuit wiring 4 through the contact hole 26.

Through these steps, the supporting leg 20 has a double-layer structure of the insulation layer 23 (composed of the silicon oxide films 21 and 22) and the aluminum wiring layer 24, and therefore, exhibits the bi-material effect. Since the aluminum is formed by sputtering at a room temperature, when applied a higher temperature than a room temperature, the aluminum is non-reversibly warped and deformed (shrinkage deformation in this case).

Figure 4E:
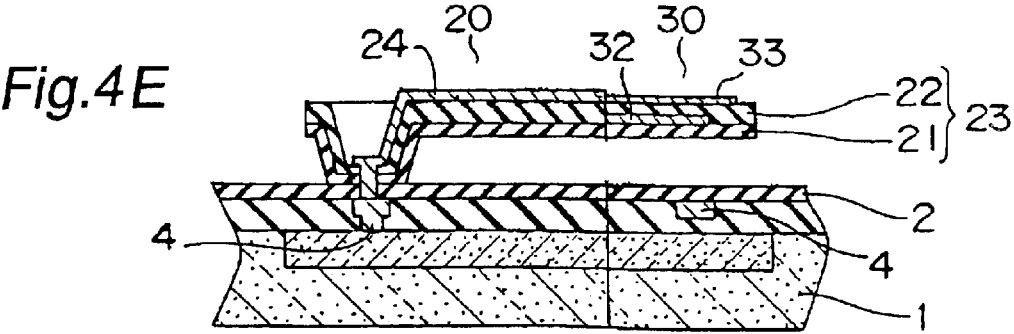

Step 5: As shown in FIG. 4E, the sacrificial layer 6 is dissolved using xenon difluoride, and the heat insulation structure portion 30 supported in midair by the supporting leg 20 is completed.

Through these steps, the infrared light detection array 110 comprising the plurality of the infrared light detectors 100 is completed.

Even if produced with the greatest care, the infrared light detectors 100 find different quantities of warping of the supporting legs 20 from each other. Since the supporting angles of the heat insulation structure portions 30 (i.e., the angles between the silicon substrate 1 and the heat insulation structure portions 30) are accordingly different from each other among the arrays, even when reading light is irradiated upon the infrared light detection array, this difference is detected as a fixed pattern noise.

In contrast, the producing method according to this embodiment requires to correct the angles of warping (supporting angles) in such a manner that the supporting angles in all infrared light detectors 100 forming the infrared light detection array 110 become approximately similar to each other. The correction method to this end will now be described below.

Figure 5:
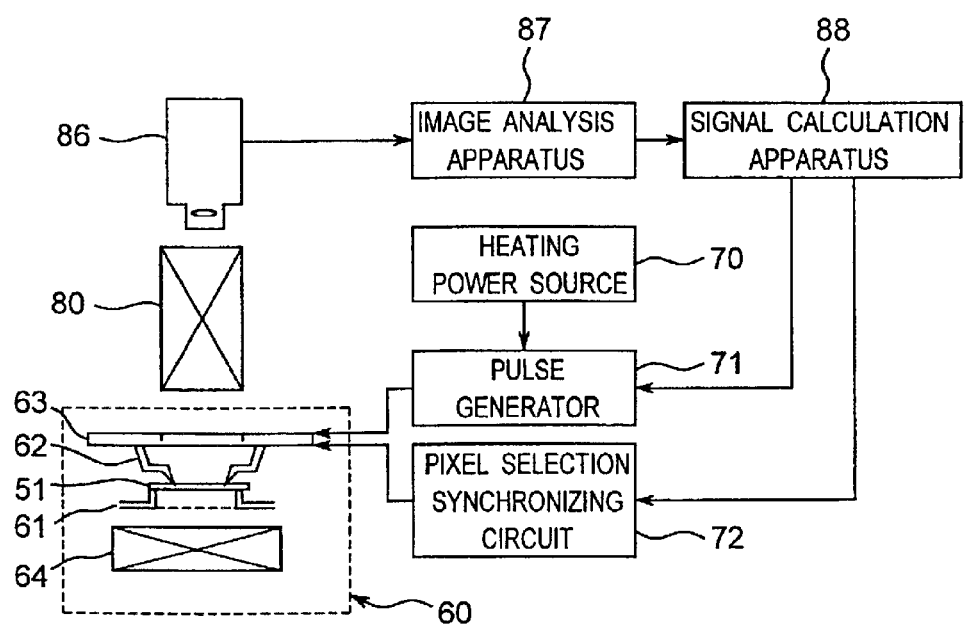
FIG. 5 is a schematic of the correction system according to the first preferred embodiment of the present invention.

First, as shown in FIG. 5, a chip 51 now seating the infrared light detection array 110 as a result of the steps 1 through 5 described above is fixed to a stage 61 of a probe apparatus 60. A probe needle 62 of the probe apparatus 60 is then brought into contact with a terminal pad of the chip 51, so that it is ready to apply a control voltage upon the chip 51.

A drive voltage, a clock voltage and the like for driving the infrared light detection array 110 are supplied through a probe card 63 from the heating power source 70, the pulse generator 71 and the pixel selection synchronizing circuit 72. The stage 61 to mount the chip 51 is open at a position corresponding to an incident surface of the chip 51 where infrared light impinges. Uniform infrared light is irradiated from a flat-type blackbody furnace 64 placed below the infrared light detection array 110 onto the entire surface of incidence of the infrared light detection array 110 where the infrared light impinges. Depending on the shape of the blackbody furnace 64, the infrared light may be irradiated uniformly upon the entire surface of the infrared light detection array 110 by means of an optical system.

In front of the infrared light detection array 110, a reading optical system 80 is disposed having a design to change the quantity of detected reflection light in accordance with a change in angle of a reflection surface of the infrared light detector (pixel) 100 irradiated with the infrared light.

Figure 6:
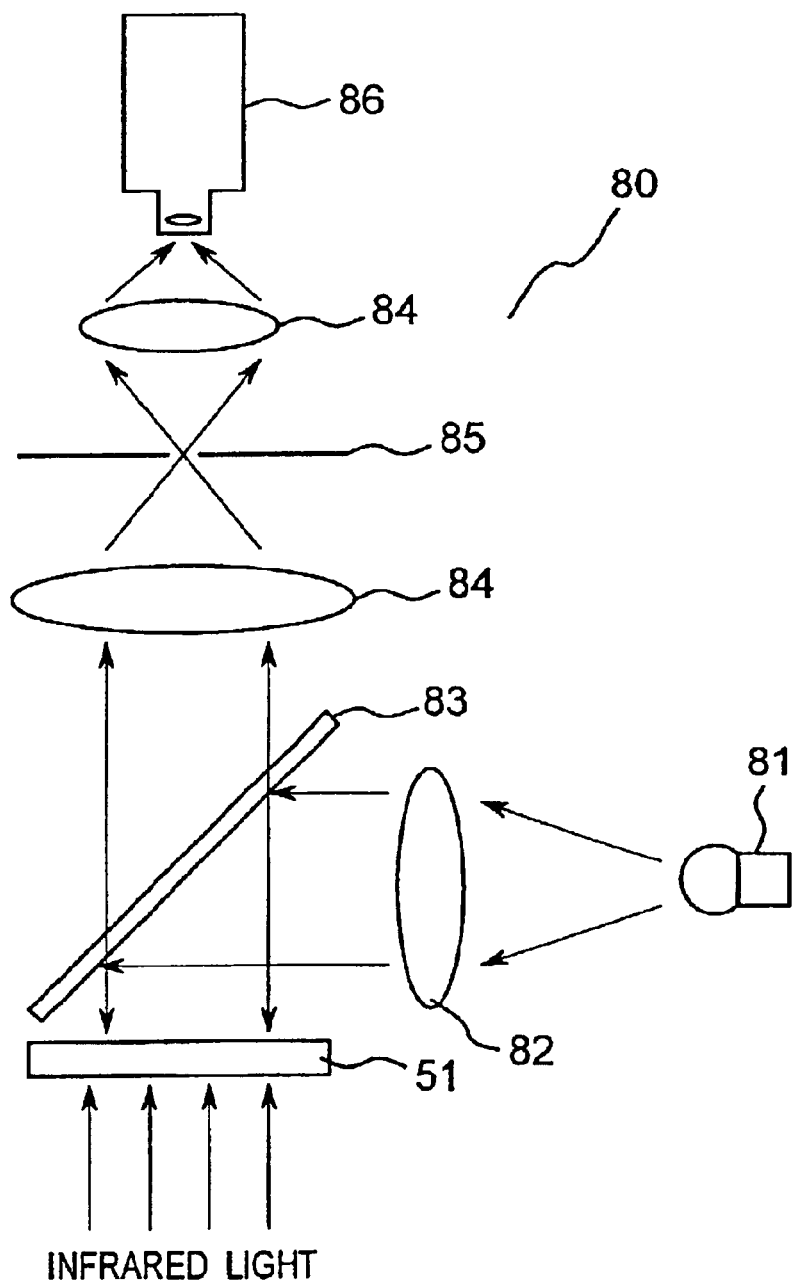
FIG. 6 is a schematic of the reading optical system.

Various types of structures may be used for the reading optical system 80. And one of them is shown in FIG. 6. In the reading optical system 80, a laser diode 81 is used as a reading light source, and by means of a collimator lens 82 and a beam splitter 83, parallel light is incident upon the chip 51 mounting the infrared light detection array. If the reflection surfaces of all pixels are not warped (i.e., no inclination), reading light is reflected in the same direction as the normal line of incidence. Passing through the lens 84, the reading light converges at approximately one point.

On the contrary, if there is a warped reflection surface, the position of convergence of the reading light reflected by the corresponding pixel is different from the position of convergence of the other rays. With a stop 85 for restricting the flux of the reading light disposed at the convergence point of the reading light, the reading light is blocked in accordance with the quantity of warping. Since the quantity of the blocked light changes in accordance with the quantity of the infrared light irradiated upon the subject or the reading optical system, it is desirable that the stop 85 is variable so as to adjust the quantity of the blocked light. Passing through the stop 85, the reading light is focused into an image by the lens 84 on a light receiving surface of a CCD camera 86. The CCD camera 86 detects the quantities of warping at the pixels as the strong or weak contrast of the image formed by the reading light. Thus, the infrared light impinging upon the infrared light detection array 110 is detected as the image formed by the reading light.

As shown in FIG. 5, a signal detected by the CCD camera 86 is transmitted to an image analysis apparatus 87 and the quantities of the reflection light at the respective pixels are quantitatively calculated.

Meanwhile, the heating power source 70 for passing a current through the resistors within the infrared light detection array 110 is connected with the infrared light detection array 110 through the pulse generator 71. The pixel selection synchronizing circuit 71 drives the horizontal/vertical scanning circuits contained in the infrared light detection array 110.

A signal calculation apparatus 88 has a function of receiving position information regarding the positions of the pixels on the infrared light detection array 110 and data regarding the quantities of the reflection light from the image analysis apparatus 87, controlling the synchronizing circuit and the pulse generator of the infrared light detection array 110 and adjusting the number of pulses for an electric current to the respective pixels in accordance with the quantities of the reflection light.

As described above, the synchronizing circuit is operated so that a pixel A is selected and the pixel A pulsed in the infrared light detection array 110. The pulsed current heats up the resistor included in the pixel A and accordingly increases the temperature of the pixel A. The temperature of the resistor is controlled preferably by the time of pulsed current. As a result of this electrifying, the quantity of warping (quantity of bending) of the supporting leg changes owing to the bi-material principle. When the quantity of reflection light at the pixel A reaches a predetermined quantity, the electrifying of the pixel A is terminated. Since the aluminum wiring layer of the supporting leg is formed by sputtering at the room temperature, heating of the supporting leg in such a manner causes the aluminum wiring layer to shrink. The shrinkage of the aluminum wiring layer is nonreversible.

Next, a pixel B next to the pixel A is selected and electrified in a similar fashion, whereby the quantity of reflection light is adjusted. As all pixels are energized one after another, the quantities of reflection light at all pixels become uniform.

Figure 7:
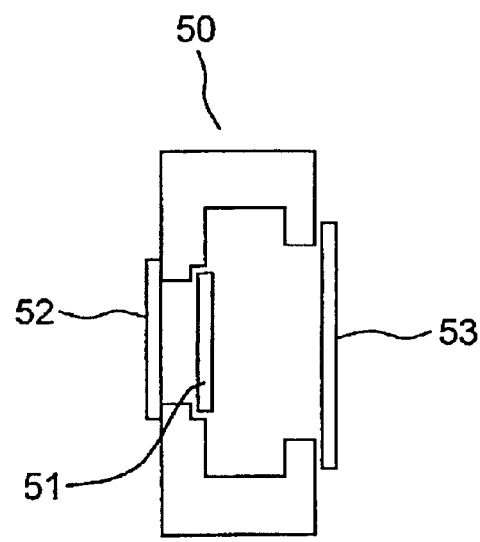
FIG. 7 is a schematic of the vacuum package.

The chip 51 seated in the infrared light detection array having the quantities of warping in all pixels corrected to be uniform through such a correction step above is mounted to a vacuum package as indicated in its entirety by 50 in FIG. 7. The vacuum package 50 includes an infrared transmission window 52 for infrared light to enter and a visible light transmission window 53 for reading light to enter and exit.

The mounting to the vacuum package 50 aims at prevention of heat radiation caused by convection from the heat insulation structure portions, and hence, improvement of the detection sensitivity.

Figure 8:
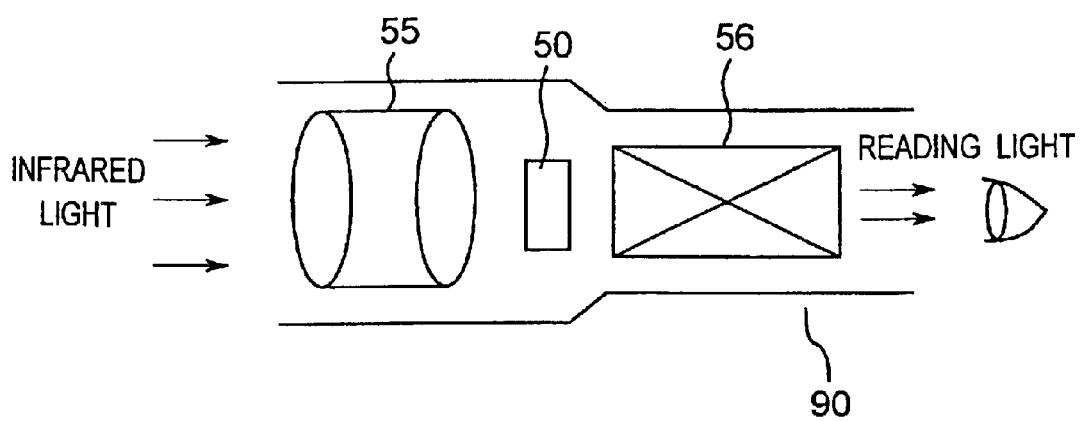
FIG. 8 is a schematic diagram of the direct-vision infrared light detecting apparatus.

FIG. 8 is a schematic of a direct-vision infrared light detecting apparatus indicated in its entirety by 90 for application of the infrared light detection array.

The direct-vision infrared light detecting apparatus 90 consists of a combination of the vacuum package 50 mounting the infrared light detection array, an infrared lens 55 and a reading optical system 56. The reading optical system 56 may have the same structure as that of the reading optical system 80 described earlier.

In the infrared light detecting apparatus 90, infrared light exiting from a subject passes through the infrared lens 55 and impinges upon the infrared light detection array inside the vacuum package 50. On the other hand, light leaving the reading optical system 56 impinges upon the infrared light detection array, and after reflected by a reflection plate of the infrared light detection array, it exits from the infrared light detecting apparatus 90 as reading light. Hence, directly looking at this reading light with eyes for instance, one can see the image of the subject.

Of course, without limiting to direct vision, an infrared image may be captured with a CCD camera or the like attached to an ocular portion of the reading optical system.

Although silicon oxide is used as the materials of the supporting legs 20 and the heat insulation structure portions 30 in the infrared light detectors 100 described above, silicon nitride, a combination of silicon oxide and silicon nitride or the like may be used instead of silicon oxide.

Further, although titanium is used as the material of the resistors 32, other metal to be resistant to heat generated during the correction of the quantities of warping may be used. Among a variety of metals, titanium nitride, tantalum nitride and tantalum in particular, having relatively high electrical resistivity and being resistant to a high temperature, are preferable materials.

Further, the aluminum wiring layer disposed in the supporting legs 20 may be replaced with other metal layer having a largely different thermal expansion coefficient from another material (e.g., silicon oxide, silicon nitride, etc.) of the bi-material. Titanium nitride, titanium, aluminum, tungsten, gold, copper and platinum in particular are preferable as these materials exhibit excellent adhesion with silicon oxide and silicon nitride and have largely different thermal expansion coefficients from those of silicon oxide and silicon nitride.

Further, instead of repeatedly energizing each pixel with pulses until the quantity of reflection at this pixel reaches the predetermined quantity for the purpose of correcting the supporting angle (quantity of warping) of the heat insulation structure portion as described above, pulsed current may be carried so as to scan all of the pixels. In this case, one pulse is applied to those pixels in need of being electrified but no pulse is applied to those pixels having no need of electrifying.

In such electrifying through these steps, an interval from the first pulse electrifying of one pixel until the next pulse electrifying is a period of time for all other pixels to be electrified, pulsed current intervals are sufficiently long. Hence, it is possible to remove an influence of temperature increases at the pixels due to the pulse electrifying and accordingly obtain the accurate quantities of reflection light at the room temperature, and since the scanning circuits for selecting the pixels can be controlled at a constant speed, the structure of the scanning circuits and a method of driving the scanning circuits can be easy.

Second Preferred Embodiment

Figure 9:
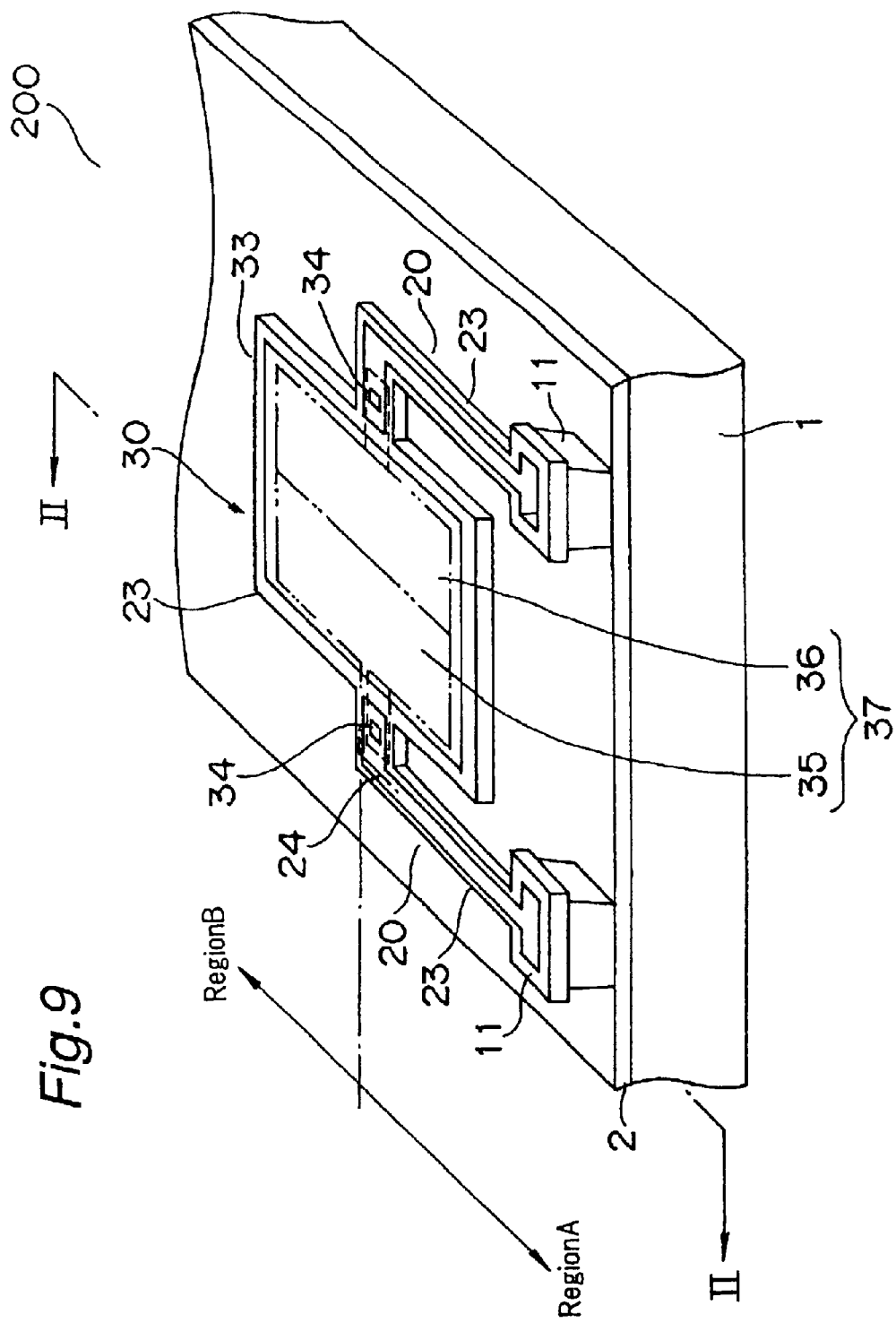
FIG. 9 is a perspective view of the infrared light detector according to the second preferred embodiment of the present invention.

FIG. 9 is a perspective view of an infrared light detector according to a second preferred embodiment indicated in its entirety by at 200. In FIG. 9, the same reference symbols as those used in FIG. 1 denote the same or corresponding portions.

Instead of the resistor 32, the infrared light detector includes a pn junction diode 37 consists of a p-type silicon region 35 and an n-type silicon region 36.

FIGS. 10A–10E are cross sectional views showing steps of producing the infrared light detector 200. FIGS. 10A–10E show a cross section of FIG. 9 taken along the II—II direction. In FIGS. 10A–10E, the same reference symbols as those used in FIGS. 4A–4E denote the same or corresponding portions. The producing method includes the following steps 1 through 5.

Figure 10A:
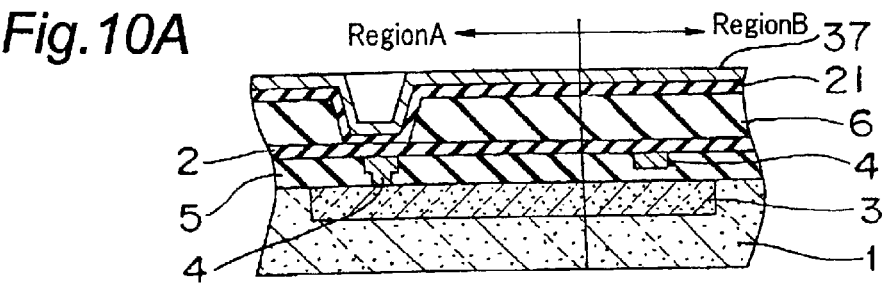
FIGS. 10A–10E are cross sectional views showing the steps of manufacturing the infrared light detection array according to the second preferred embodiment of the present invention.

Step 1: As shown in FIG. 10A, by a method similar to that described above in relation to the first preferred embodiment, the elements up to the silicon oxide film 21 are formed on the silicon substrate 1. A polycrystalline silicon layer 37 is then formed on the silicon oxide film 21.

Figure 10B:
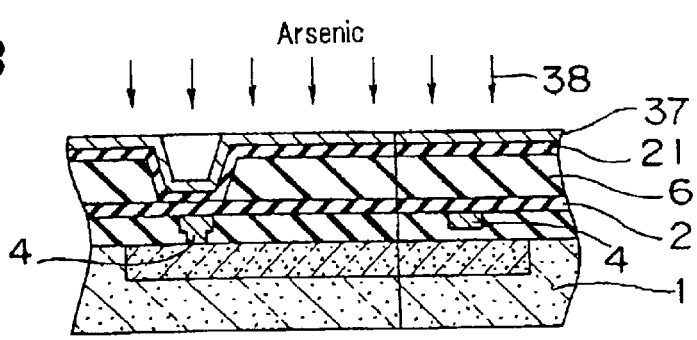

Step 2: As shown in FIG. 10B, n-type ions 38 such as arsenic for instance are implanted into the entire surface of the polycrystalline silicon layer 37.

Figure 10C:
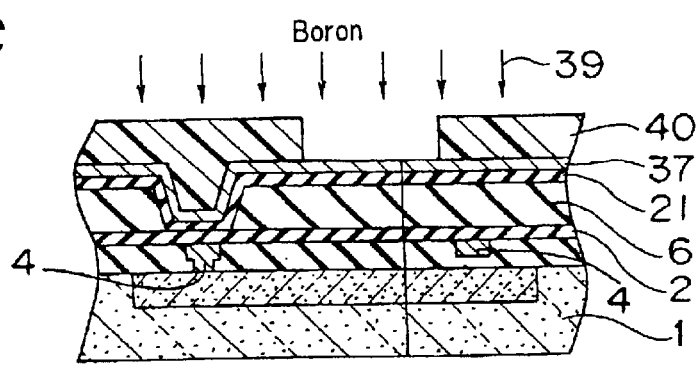

Step 3: As shown in FIG. 10C, after forming a resist mask 40, p-type ions 39 such as boron for example are implanted. As a result, a pn junction is formed.

Figure 10D:
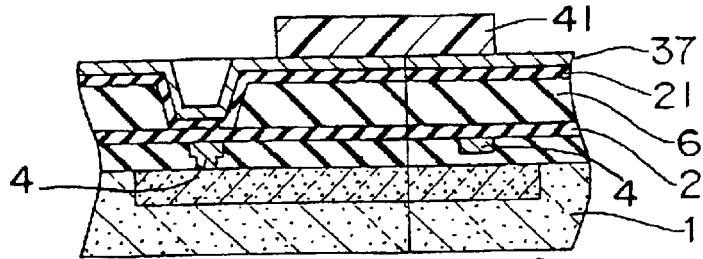

Step 4: As shown in FIG. 10D, a resist mask 41 is formed on the polycrystalline silicon layer 37, and through etching using chloride gas plasma, the unnecessary portion of polycrystalline silicon layer 37 is removed. Thus, the polycrystalline silicon layer 37 as that shown in FIG. 9 consists of the p-type region 35 and the n-type region 36 is formed.

Figure 10E:
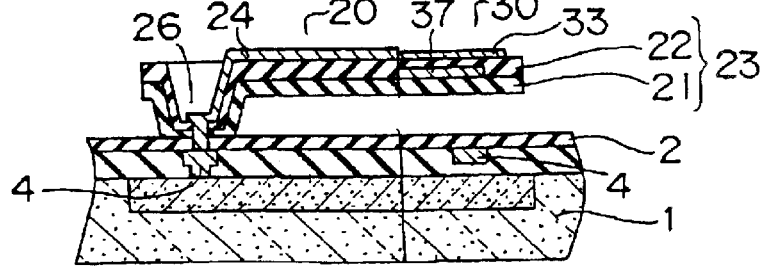

Step 5: As shown in FIG. 10E, alike in the first preferred embodiment, the silicon oxide film 22 is formed on the polycrystalline silicon layer 37 and flattened by CMP. Following this, a reflection film 33 of aluminum is formed and annealed at 400° C. Further, after forming a contact hole 26, the aluminum wiring layer 24 is formed by sputtering at the room temperature. At last, a sacrificial layer 6 is dissolved using xenon difluoride, thereby completing the infrared light detector 200 as that shown in FIG. 9.

Figure 11:
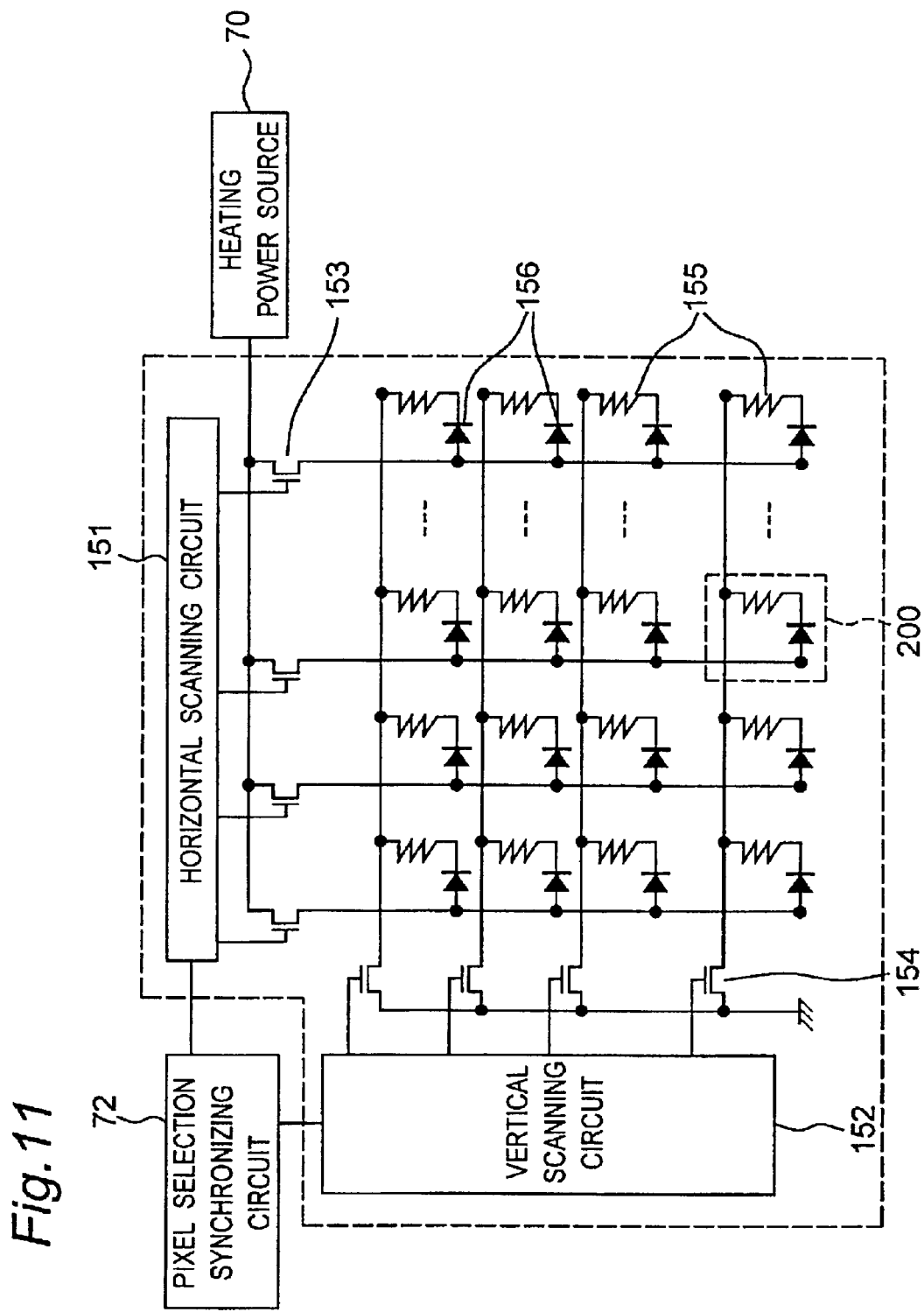
FIG. 11 is a circuit diagram of the infrared light detection array according to the second preferred embodiment of the present invention.

FIG. 11 is a circuitry diagram of an infrared light detection array 210 which includes the infrared light detectors 200. In FIG. 11, the same reference symbols as those used in FIG. 3 denote the same or corresponding portions.

This infrared light detection array is the same in structure as the infrared light detection array 110 according to the first preferred embodiment except that diodes 155 are used as the control elements for pixel selection.

In the infrared light detection array 210, diodes 156 and the resistors 155 are connected in series in the respective pixels. Since the diodes 156 prevents a current from adversely flowing, the pixels can be selected even without using the switching transistor 154 (See FIG. 3.) in each pixel. The switching transistors 154 are disposed on the rows in the infrared light detection array.

Although expressed as series connections of the diodes 156 and the resistors 155 in the circuitry diagram, the circuits of the infrared light detectors 200 are pn junction diodes having these two elements in real structure.

As more than one pn junction diodes are formed and connected in series, it is possible to adjust the resistance values.

In the infrared light detection array 210, as in the first preferred embodiment, it is possible to drive the horizontal scanning circuit 151 and the vertical scanning circuit 152 with the external pixel selection synchronizing circuit 72 so as to electrify each pixel. As for the number of rows and columns in the infrared light detection array according to the second preferred embodiment, there are 128 rows and 128 columns as in the first preferred embodiment. As for a means of correcting the quantity of warping at each pixel, a method similar to that of the first preferred embodiment is performed.

The infrared light detection array 210 corrects the supporting angles (quantities of warping) of the heat insulation structure portions 30 using the system shown in FIG. 5, which is similar to the first preferred embodiment.

The chip corrected so as to be uniform in warping quantities can be mounted to the vacuum package as in the first preferred embodiment, and further incorporated in a direct-vision infrared light detecting apparatus (See FIGS. 7 and 8.).

As described above, since the infrared light detection array 210 according to the second preferred embodiment includes less number of switching transistors, the manufacturing steps are simplified.

Third Preferred Embodiment

Figure 12:
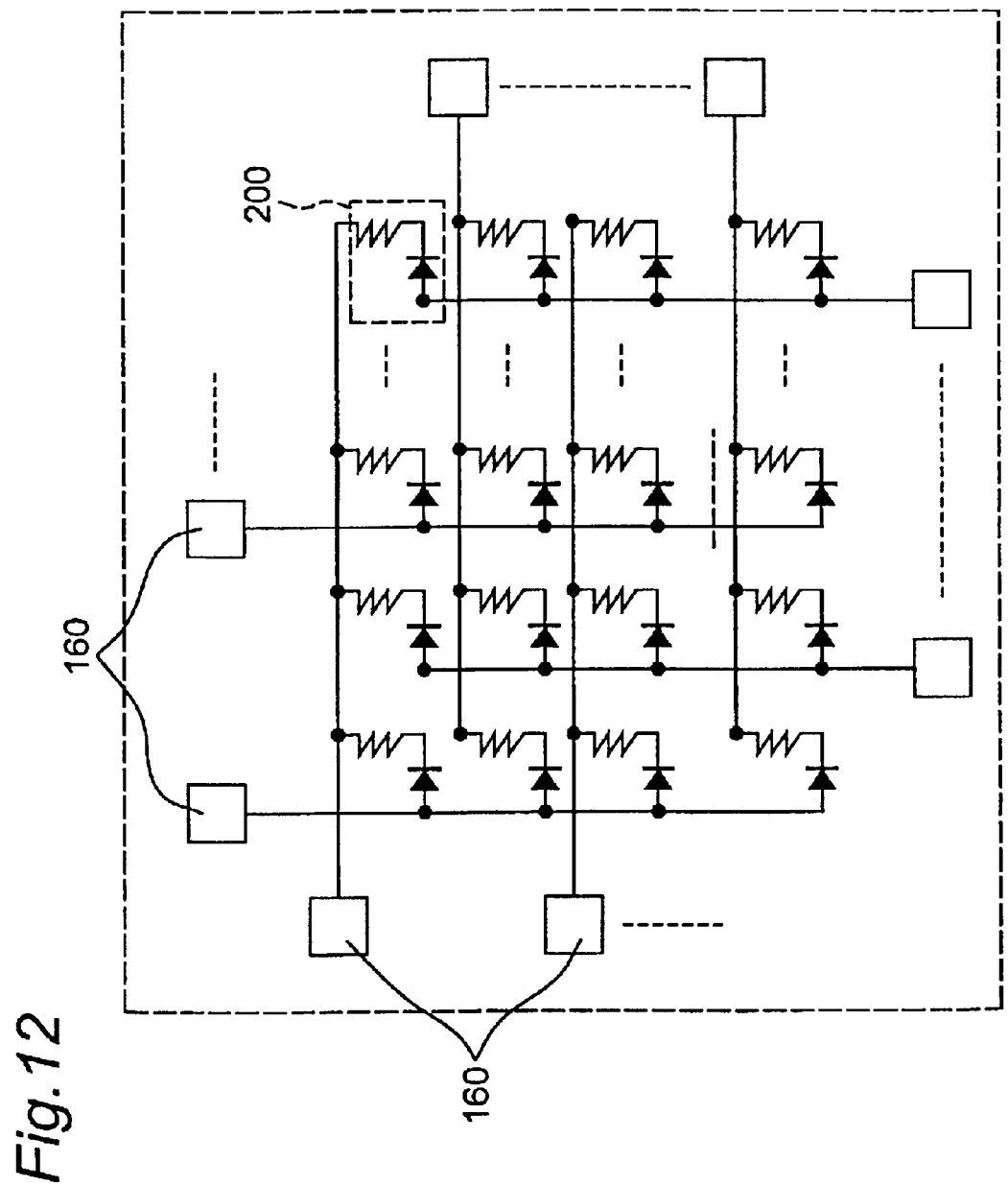
FIG. 12 is a circuit diagram of the infrared light detection array according to the third preferred embodiment of the present invention.

FIG. 12 is a circuit diagram of an infrared light detection array 220 according to a third preferred embodiment. In FIG. 12, the same reference symbols as those used in FIG. 11 denote the same or corresponding portions.

As for the arrangement of the pixels, 32 pixels are disposed vertically and 32 pixels are disposed horizontally, and wires for the respective pixels are connected with pads 160. This allows the diodes in the respective pixels to carry a current via the pads from outside.

Thus, since the resistors of the respective pixels are diodes in the infrared light detection array 220, the pixels can be selected and energized even without using a horizontal scanning circuit and a vertical scanning circuit. Hence, while there is a restriction on the size of the array chip, it is possible to form a relatively large array.

The reason of disposing 32 pixels vertically and 32 pixels horizontally in the pixel arrangement is to consider the scale enough to fabricate the pads 160 at the periphery of the array in accordance with the number of the pixels, and therefore, this arrangement is not limited.

Figure 13:
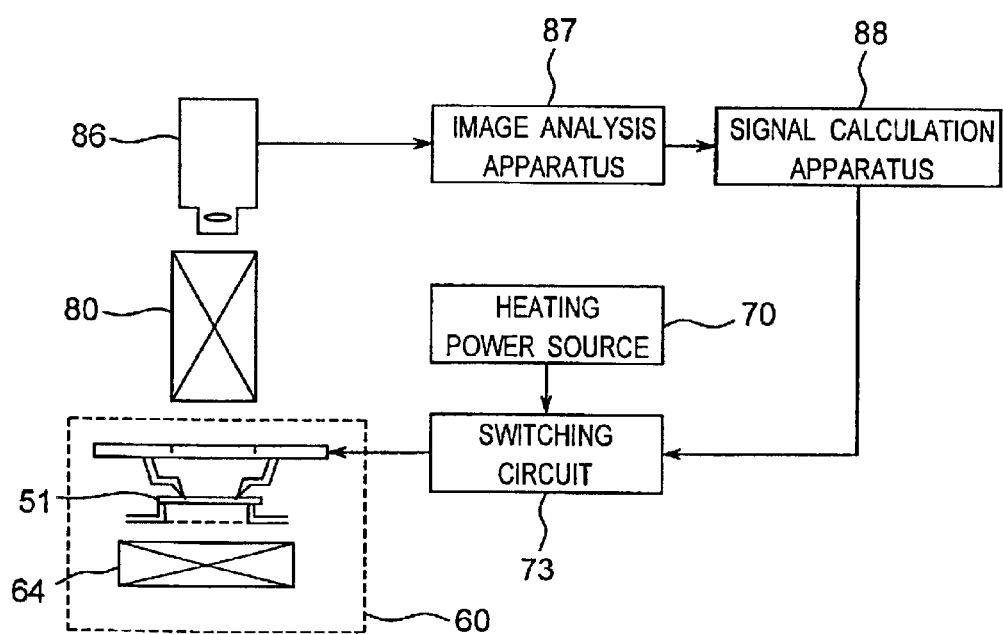
FIG. 13 is a schematic of the correction system according to the third preferred embodiment of the present invention.

FIG. 13 is a schematic diagram of a system used for correction at the respective pixels in the infrared light detection array 220. In FIG. 13, the same reference symbols as those used in FIG. 5 denote the same or corresponding portions.

During correction in the infrared light detection array 220, the chip 51 including the infrared light detection array 220 is fixed to the probe apparatus 60, and infrared light is uniformly irradiated upon the entire surface of the array using the flat-type blackbody furnace 64 as in the first preferred embodiment.

As in the first preferred embodiment, on the reflection surface side of the array is disposed the reading optical system 80 designed so as to change the quantity of reflection light in accordance with a change in angle of the reflection surface of the pixel irradiated with the infrared light. After passing through the reading optical system 80, reading light is focused into an image on the light receiving surface of the CCD camera 86 and detected. From a detection signal, the image analysis apparatus 87 calculates the quantity of the reflection light in each pixel.

Meanwhile, the heating power source 70 for pulsed current to the infrared light detection array 220 is connected with the array through a switching circuit 73. As the heating power source 70 and the switching circuit 73 are turned on, then the temperatures increase at the resistors in the respective pixels, thereby leading to a nonreversible change in warping of the supporting legs. The CCD camera 86 monitors the reflection light while pulsed current is off, and when the quantity of the reflection light at a certain pixel reaches a predetermined quantity, then the switching circuit is controlled so as to terminate the electrifying to this pixel. As this step is performed on the respective pixels, the quantities of the reflection light at all of the pixels contained in the infrared light detection array 220 become uniform.

The chip corrected in this manner is mounted to the vacuum package 50 as in the first preferred embodiment, and further incorporated in the direct-vision infrared light detecting apparatus 90 (See FIGS. 7 and 8.).

Fourth Preferred Embodiment

Figure 14:
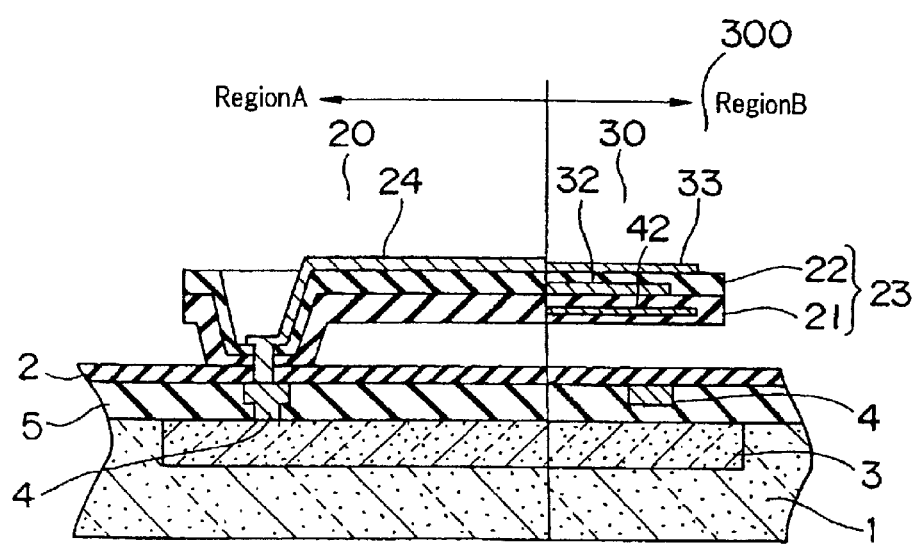
FIG. 14 is a cross sectional view of the infrared light detector according to the fourth preferred embodiment of the present invention.

FIG. 14 is a cross sectional view of an infrared light detector according to a fourth preferred embodiment indicated in its entirety by 300. FIGS. 15A–15D show a cross section during steps for manufacturing the infrared light detector 300. In FIG. 14, the same reference symbols as those used in FIG. 1 denote the same or corresponding portions. This cross section is a cross section taken along a portion corresponding to I—I in FIG. 1.

In the infrared light detector 300, a thin film of nichrome with adjusted thickness to achieve a sheet resistance of about 400 $\Omega/\square$ is disposed as an infrared absorbing film 42 in the silicon oxide film 21 of the heat insulation structure portion 30. The other structure is the same as that of the infrared light detectors 100 shown in FIG. 1.

It is desirable that the silicon oxide film between the infrared absorbing film 42 and the reflection film 33 is about 1.2 $\mu$m in film thickness. This is because when the film thickness of this silicon oxide film is about 1.2 $\mu$m, the optical film thickness to infrared light having wavelength of 10 $\mu$m is about 2.5 $\mu$m, and the best absorptance is achieved.

It is designed to ensure the best absorptance to infrared light having wavelength of 10 $\mu$m, because the energy emittance of infrared light from a subject near the room temperature is largest in the vicinity of wavelength of 10 $\mu$m and the detection sensitivity of the infrared light detector improves when the absorption efficiency of this wavelength increases.

A method of producing the infrared light detector 300 will now be described with reference to FIGS. 15A–15D. In FIGS. 15A–15D, the same reference symbols as those used in FIGS. 4A–4E denote the same or corresponding portions. The producing method includes the following steps 1 through 4.

Step 1: As the first preferred embodiment, the elements up to the sacrificial layer 6 are formed one after another on the silicon substrate 1, and the silicon oxide film 21 is thereafter formed (See FIG. 15A.). At this step, the silicon oxide film 21 is formed into two layers.

To form the silicon oxide film 21, first, a silicon oxide film to serve as a first layer is formed. On top of that, an infrared absorption film 37 consists of a thin film of nichrome is formed. And further, a silicon oxide film to serve as a second layer is formed so as to cover the infrared absorption film 37. The first-layer silicon oxide film is preferably as thin as possible.

To be suitable, the thin nichrome film to serve as the polycrystalline silicon layer 37 has a sheet resistance of 100 to 500 $\Omega/\square$. And to be more suitable, the film thickness of the thin nichrome film is adjusted such that this sheet resistance becomes 300 to 400 $\Omega/\square$. The infrared absorption film 37 is patterned through a photolithographic step and an ion milling step.

Figure 15A:
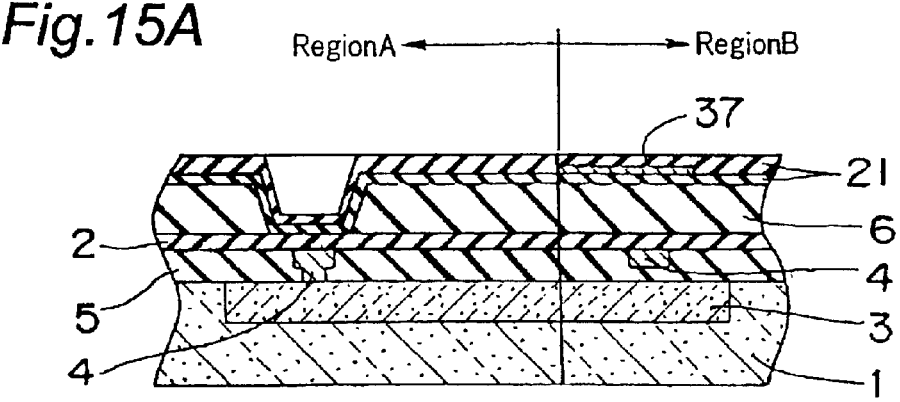
FIGS. 15A–15D are cross sectional views showing the steps of manufacturing the infrared light detection array according to the fourth preferred embodiment of the present invention.
Figure 15B:
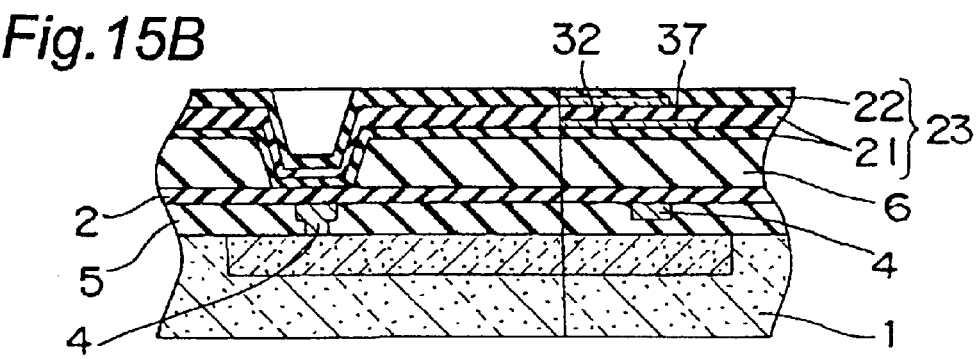

Step 2: As shown in FIG. 15B, the resistor 32 of titanium is formed on the silicon oxide film 21, and the silicon oxide film 22 is formed on the silicon oxide film 21 and flattened by CMP. The resistor 32 has a meandering shape.

The thickness of the silicon oxide film 22 is adjusted such that the distance between the polycrystalline silicon layer 37 and the reflection film 33 becomes about 1.2 $\mu$m. Considering the index of refraction of silicon oxide in this manner, the optical film thickness of the dielectric element on the infrared absorption film 37 is about 2.5 $\mu$m.

In this condition, annealing is performed at about 400° C.

Figure 15C:
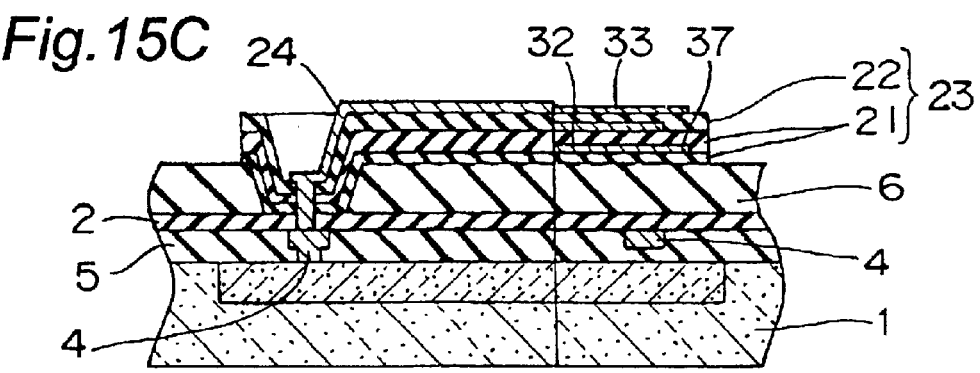
Figure 15D:
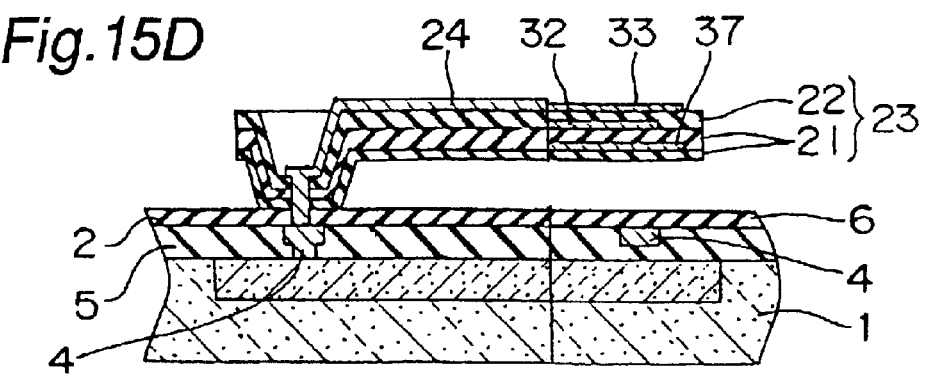

Steps 3, 4: As shown in FIGS. 15C and 15D, as the first preferred embodiment, the sacrificial layer 6 is dissolved after the aluminum wiring layer 24 is formed by sputtering at the room temperature. Through these steps above, the infrared light detector 300 shown in FIG. 14 is completed.

An infrared light detection array 310 comprising the plurality of the infrared light detectors 300 is set to the correction system shown in FIG. 5, and the quantities of warping at the respective pixels are corrected by the same method as that according to the first preferred embodiment.

A chip containing the infrared light detection array 310 with warping quantities corrected to be uniform is mounted to the vacuum package 50 as in the first preferred embodiment, and further incorporated in a direct-vision infrared light detecting apparatus (See FIGS. 7 and 8.).

The infrared light detection array 310 includes the infrared absorption film 37 according to the fourth preferred embodiment and further the distance between the infrared absorption film 37 and the reflection film 33 is constant, and therefore, the sensitivity of detecting infrared light improves.

Fifth Preferred Embodiment

Figure 16:
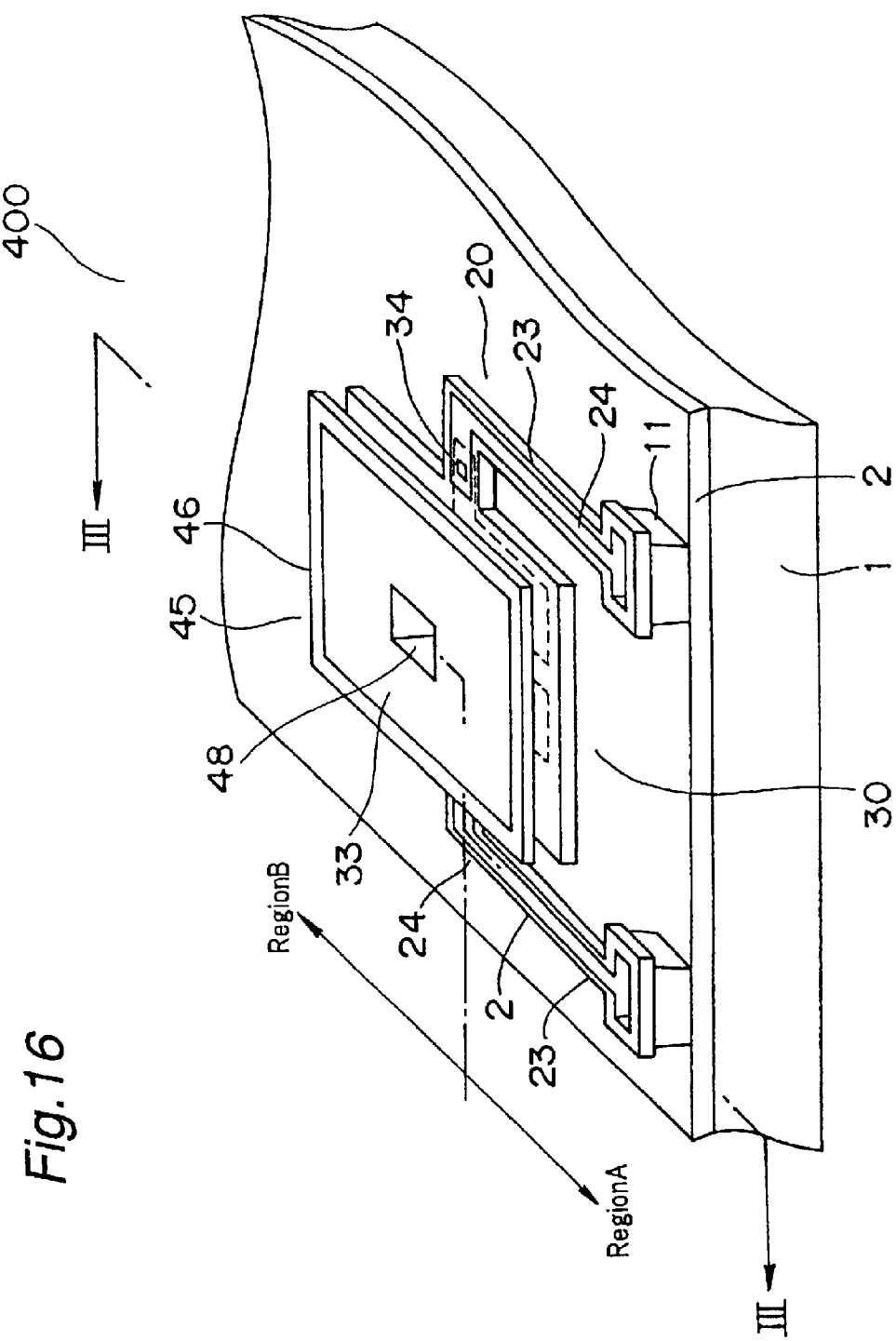
FIG. 16 is a perspective view of the infrared light detector according to the fifth preferred embodiment of the present invention.

FIG. 16 is a perspective view of an infrared light detector according to a fifth preferred embodiment indicated in its entirety by 400. In FIG. 16, the same reference symbols as those used in FIG. 1 denote the same or corresponding portions.

The infrared light detector 400 is characterized in that a reflecting portion 45 to reflect infrared light is formed separately from the heat insulation structure portion 30. The other structure is the same as that of the infrared light detectors 100.

The reflecting portion 45 is formed on the heat insulation structure portion 30 and consists of a silicon oxide film 46 and the reflection film 33.

Where such a structure is used, even if the heat insulation structure portion 30, the supporting leg 20 and the like are warped and deformed, the reflecting portion 45 remains intact, and therefore, the flatness of the reflection surface is maintained.

In an infrared light detection array 410 having more than one infrared light detectors 400, 128 pixels are disposed vertically and 128 pixels are disposed horizontally in the arrangement as in the infrared light detection array 110 according to the first preferred embodiment, and as scanning circuits in the silicon substrate 1 are driven by the pixel selection synchronizing circuit, the resistors of the respective pixels are caused to carry a current from outside.

A method of producing the infrared light detector 400 will now be described with reference to FIGS. 17A–17D. FIGS. 17A–17D show a cross section of FIG. 16 taken along the III—III. The producing method includes the following steps 1 through 4.

Figure 17A:
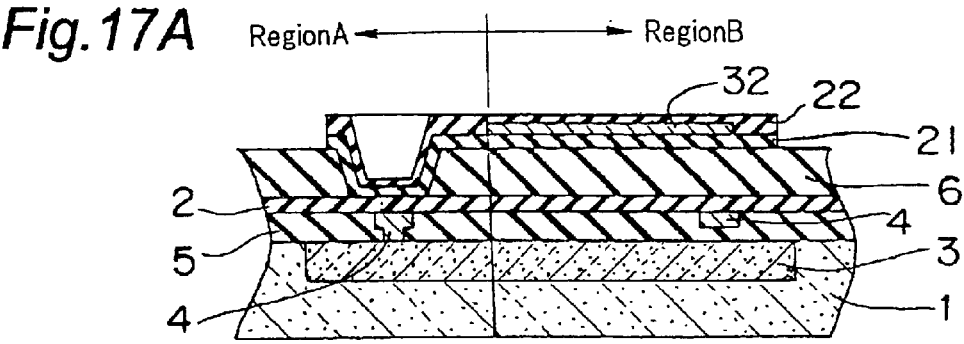
FIGS. 17A–17D are cross sectional views showing the steps of manufacturing the infrared light detection array according to the fifth preferred embodiment of the present invention.

Step 1: As shown in FIG. 17A, through a step similar to that described above in relation to the first preferred embodiment, the elements up to the silicon oxide film 22 are formed on the silicon substrate 1.

Figure 17B:
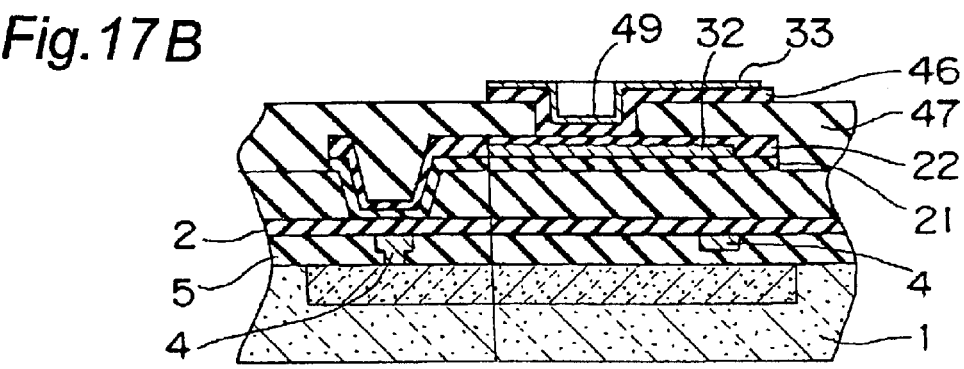

Step 2: As shown in FIG. 17B, a sacrificial layer 47 of polycrystalline silicon is deposited on the entire surface. Following this, through a photolithographic step and an etching step using chloride gas plasma, the sacrificial layer 47 is removed by a portion supposed to be a supporting column 48 of the reflecting portion 45. The silicon oxide film 46 including the reflecting portion 45 is then formed on the sacrificial layer 47 and flattened by CMP to be patterned into the shape of the reflecting portion 45. An aluminum film is formed on the flattened silicon oxide film 46, and patterned through a photolithographic step and an etching step using chloride gas plasma to form the reflection film 33.

Since fabrication of the heat insulation structure portion 30 and the reflecting portion 45 is completed at this stage, annealing is performed at about 400° C. Hence, the heat insulation structure portion 30 and the reflecting portion 45 will not get non-reversibly deformed at a temperature of 400° C. or lower.

Figure 17C:
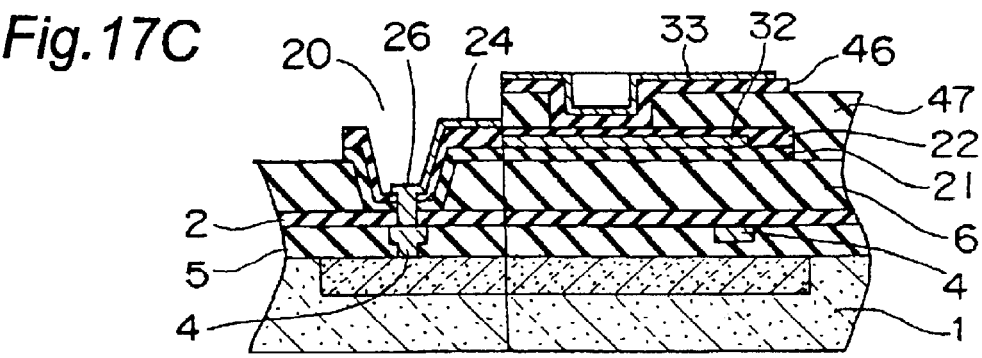

Step 3: As shown in FIG. 17C, the sacrificial layer 47 on the supporting leg 20 is removed, thereby leaving the sacrificial layer 47 in the reflecting portion 45. After forming the contact hole 26, an aluminum layer is formed by sputtering at the room temperature. Further, the aluminum layer is patterned to form the aluminum wiring layer 24 on the supporting leg 20. As a result, the supporting leg 20 has a double-layer structure of silicon oxide and aluminum, and therefore, bi-material effect become available. Since the aluminum layer is formed by sputtering at the room temperature, the aluminum layer is irreversibly warped and deformed, when applied a temperature of higher than room temperature.

Figure 17D:
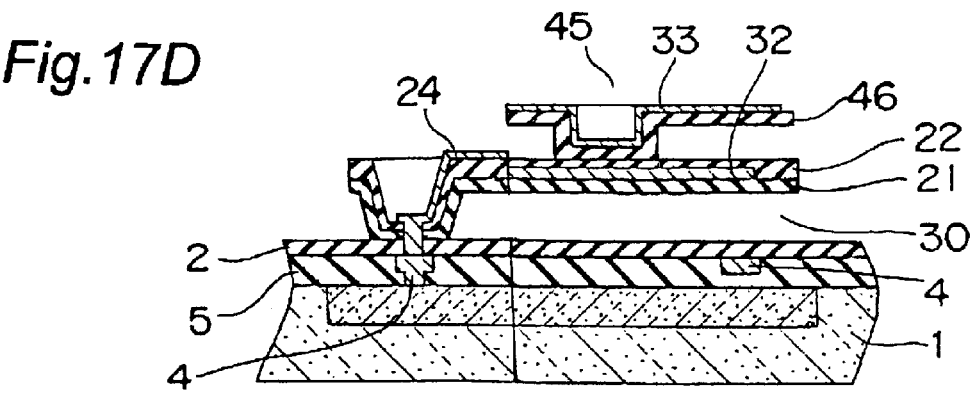

Step 4: As shown in FIG. 17D, the sacrificial layers 6 and 47 are dissolved using xenon difluoride, thereby completing the infrared light detector 400 as shown in FIG. 16.

An infrared light detection array 410 including the plurality of the infrared light detectors 400 is set into the correction system shown in FIG. 5, and the quantities of warping at the respective pixels are corrected by the same method as that according to the first preferred embodiment.

A chip having the quantities of warping corrected to be uniform is mounted to the vacuum package 50 as in the first preferred embodiment, and further incorporated in the direct-vision infrared light detecting apparatus 90 (See FIGS. 7 and 8.).

Sixth Preferred Embodiment

Figure 18:
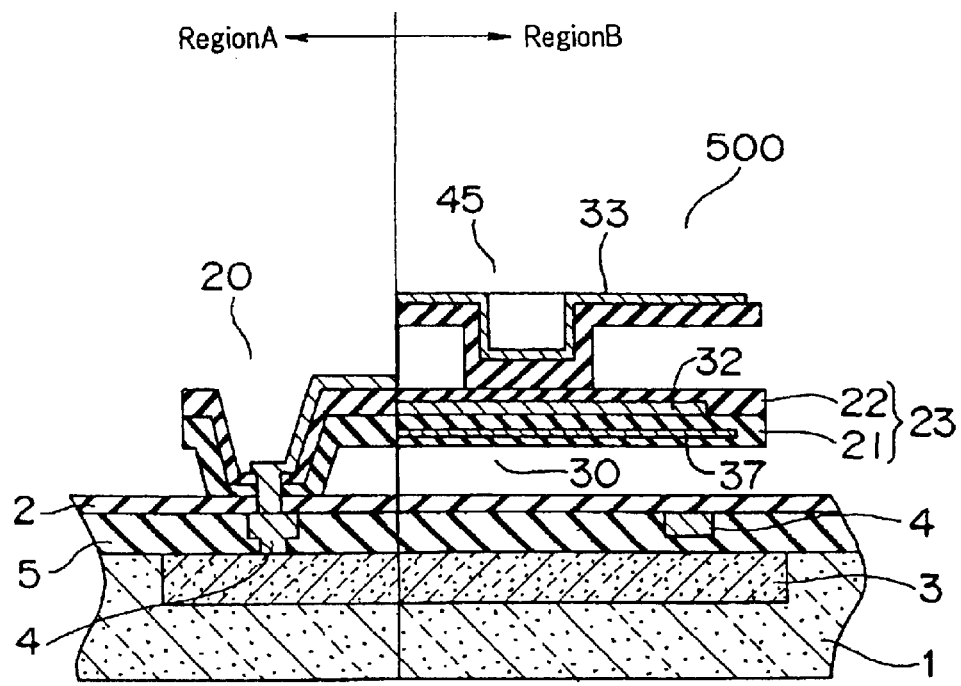
FIG. 18 is a cross sectional view of the infrared light detector according to the sixth preferred embodiment of the present invention.

FIG. 18 is a cross sectional view of an infrared light detector according to a sixth preferred embodiment indicated in its entirety by 500. In FIG. 18, the same reference symbols as those used in FIG. 16 denote the same or corresponding portions. FIG. 18 shows a cross section of FIG. 16 taken along the III—III.

The infrared light detector 500 has a structure of the infrared light detector 400 according to the fifth preferred embodiment further including the infrared absorption film 37. The thin nichrome film to serve as the polycrystalline silicon layer 37 preferably has a sheet resistance of 100 to 500 $\Omega/\square$, and more preferably, 300 to 400 $\Omega/\square$.

Since resonance absorption structures of infrared absorbing film—dielectric element—reflection film are formed in this structure, the infrared light absorptance rate becomes high. Further, since the heat insulation structure portion 30 including the infrared absorption film 37 is separated from the reflecting portion 45, the reflecting portion 45 remains intact and maintains its flatness on the surface even if the heat insulation structure portion 30, the supporting leg 20 and the like are warped and deformed.

In a method of producing the infrared light detector 500, first, the heat insulation structure portion 30 including the infrared absorbing film 37 is formed by the method according to the fourth preferred embodiment, and the reflecting portion 45 is then formed by the method according to the fifth preferred embodiment. The quantities of warping at the respective pixels are corrected by the same method as that according to the first preferred embodiment.

A chip having corrected quantities of warping to be uniform is mounted to the vacuum package 50 as in the first preferred embodiment, and further incorporated in the direct-vision infrared light detecting apparatus 90 (See FIGS. 7 and 8.).

Seventh Preferred Embodiment

Figure 19A:
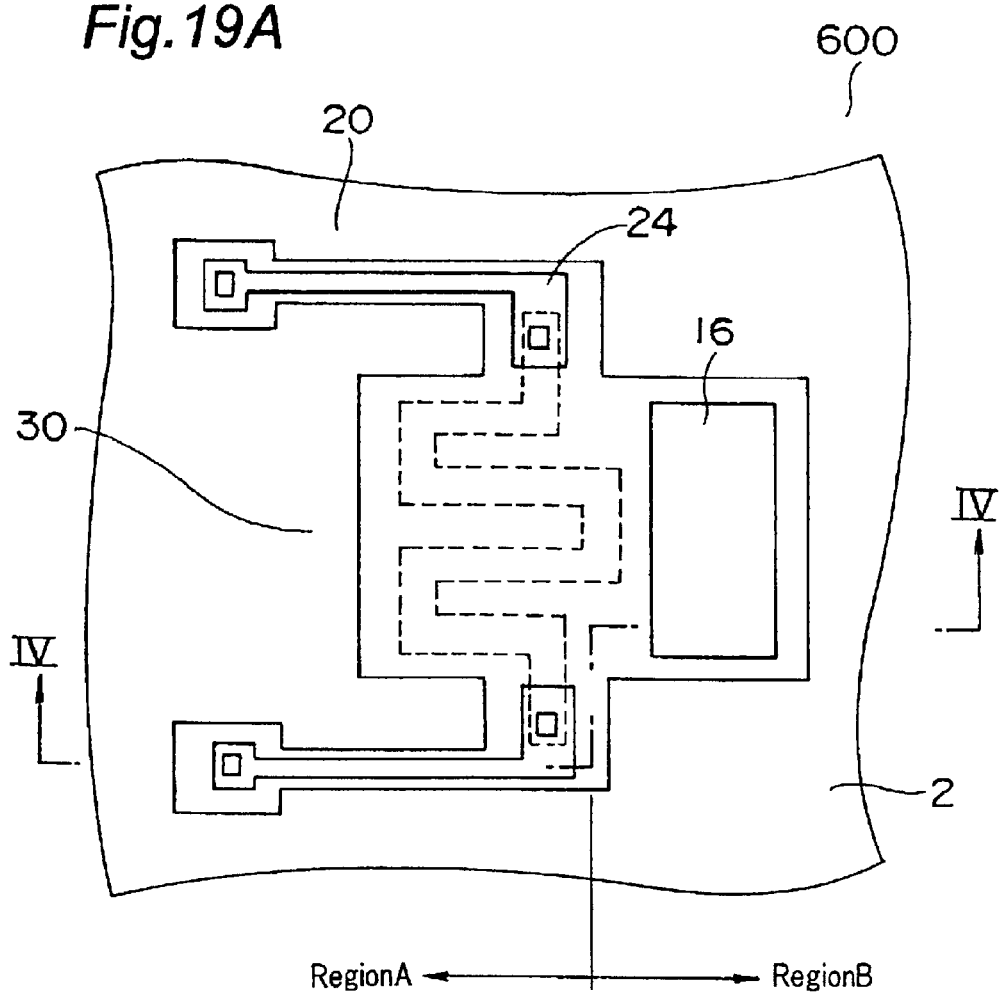
FIG. 19A is a top view of the infrared light detection array according to the seventh preferred embodiment of the present invention.
Figure 19B:
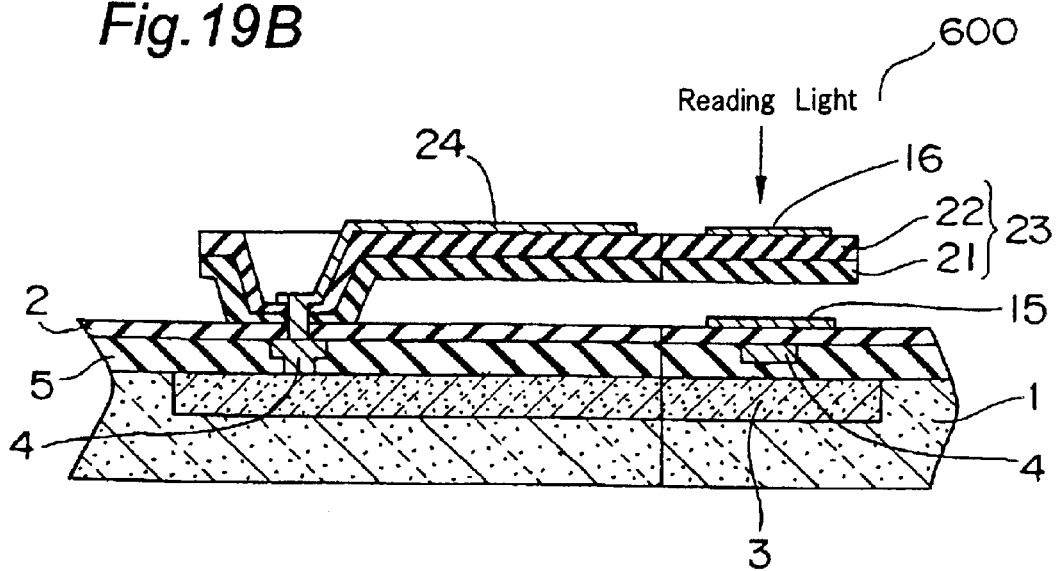
FIG. 19B is a cross sectional view of the infrared light detection array according to the seventh preferred embodiment of the present invention.

FIGS. 19A and 19B show an infrared light detector according to a seventh preferred embodiment indicated in its entirety by 600. FIG. 19A is a top view and FIG. 19B is a cross sectional view of FIG. 19A taken along IV—IV. In FIGS. 19A and 19B, the same reference symbols as those used in FIG. 1 denote the same or corresponding portions.

In the infrared light detector 600, a reflection mirror 15 is disposed on the silicon substrate 1, and a half mirror 16 is disposed on the top surface of the heat insulation structure portion 30 above the reflection mirror 15. The reflection mirror 15 and the half mirror 16 are arranged approximately parallel to each other. The other structure is the same as that of the infrared light detectors 100.

In this structure, as reading light is irradiated from above the heat insulation structure portion 30, interference occurs between the reading light reflected by the half mirror 16 and the reading light transmitted through the half mirror 16 and reflected by the reflection mirror 15. Since this interference changes in accordance with the quantity of warping (supporting angle) of the heat insulation structure portion 30, the reflection light changes in accordance with the quantity of warping.

Since the reflection mirror 15 necessary to reflect the reading light blocks infrared light, the larger the reflection mirror 15 is, the lower the detection sensitivity of the infrared light detector 600 becomes. Hence, the reflection mirror 15 preferably has a surface area in the minimum size necessary to cause the reading light to interfere.

A method of producing the infrared light detector 600 will now be described with reference to FIGS. 20A–20E. The producing method includes the following steps 1 through 5.

Figure 20A:
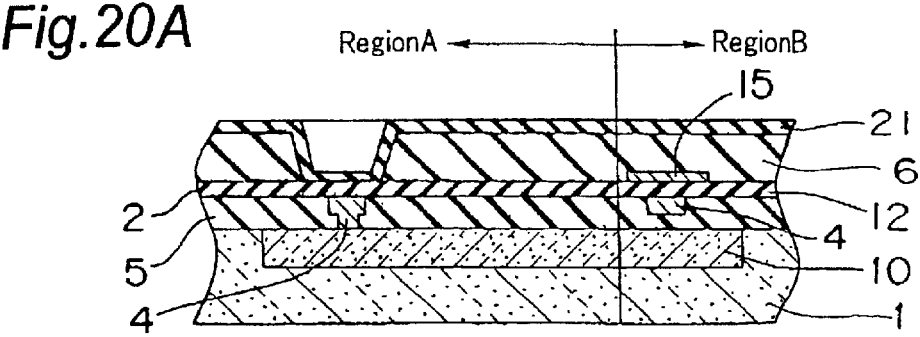
FIGS. 20A–20E are cross sectional views showing the steps of manufacturing the infrared light detection array according to the seventh preferred embodiment of the present invention.

Step 1: As shown in FIG. 20A, the protection film 2 is formed on the silicon substrate 1 with a circuit portion 10 embedded in it. An aluminum layer is then formed on the protection film 2, and the reflection mirror 15 is formed through a photolithographic step and an etching step.

Following this, the sacrificial layer 6 is formed on the reflection mirror 15, and further, the silicon oxide film 21 is formed.

Figure 20B:
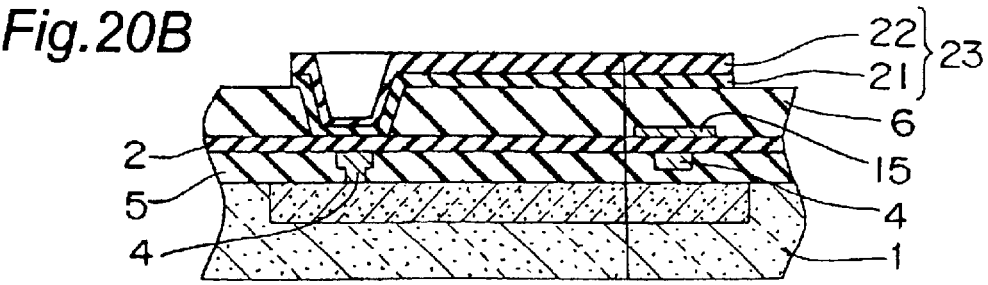

Step 2: As shown in FIG. 20B, after forming a resistor having a meandering shape (not shown), a silicon oxide film 22 is formed. After flattening of the silicon oxide film 22 by CMP, the insulation layer 23 (the silicon oxide films 21 and 22) is patterned into the shape of the supporting leg 20 and the heat insulation structure portion 30.

Figure 20C:
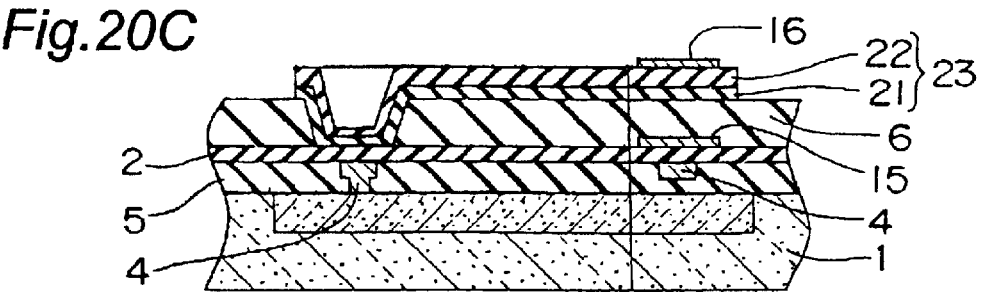

Step 3: As shown in FIG. 20C, a chromium layer is formed on the silicon oxide film 22 and patterned through a photolithographic step and an etching step, thereby forming the half mirror 16. The half mirror 16 is formed above the reflection mirror 15.

Since fabrication of the heat insulation structure portion 30 is completed at this stage, annealing is performed at about 400° C. Hence, the heat insulation structure portion 30 will not get non-reversibly deformed at a temperature of 400° C. or lower.

Figure 20D:
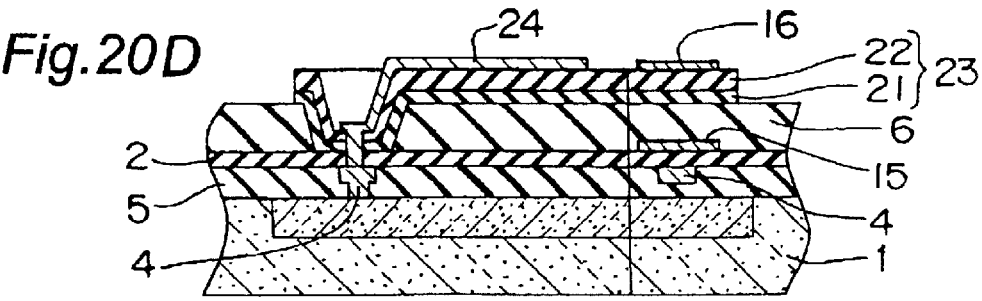

Step 4: As shown in FIG. 20D, the aluminum wiring layer 24 is formed by sputtering at a room temperature through a step similar to that described above in relation to the first preferred embodiment. The supporting leg 20 has a double-layer structure composed of the insulation layer 23 and the aluminum wiring layer 24, and therefore, the bi-material effect becomes available. Since the aluminum wiring layer is formed by sputtering at a room temperature, it is irreversibly warped and deformed when a higher temperature than a room temperature is applied.

Figure 20E:
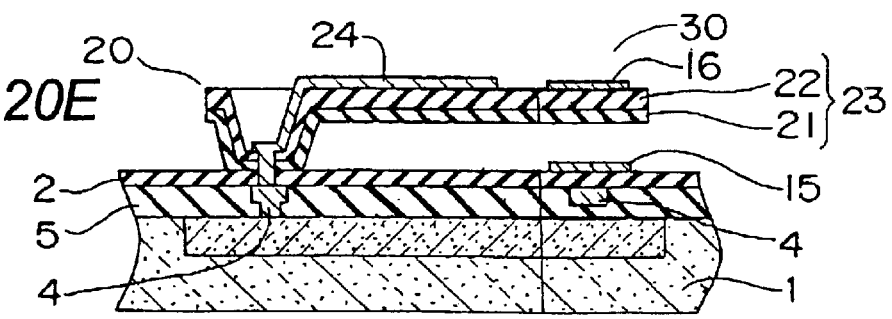

Step 5: As shown in FIG. 20E, the sacrificial layer 6 is dissolved using xenon difluoride, thereby completing the infrared light detector 600.

An infrared light detection array 610 including the infrared light detectors 600 is set into the correction system shown in FIG. 5, and the quantities of warping at the respective pixels are corrected by the same method as that according to the first preferred embodiment.

A chip having the quantities of warping corrected to be uniform is mounted to the vacuum package 50 as in the first preferred embodiment, and further incorporated in the direct-vision infrared light detecting apparatus 90 (See FIGS. 7 and 8.).

In the infrared light detector 600, as reading light is irradiated from above the heat insulation structure portion 30, the reflection intensity of the reading light is determined by the condition of interference between the reflection mirror 15 and the half mirror 16 disposed in each pixel. To correct the interfering reflection light to be uniform at all pixels, a correction method which is similar to that according to the first preferred embodiment is used.

In short, as shown in FIG. 5, the chip 51 including the infrared light detection array is set to the probe apparatus 60 and electrically connected with an external power source, a pulse generator, etc. The flat-type blackbody furnace 64 is disposed to the infrared light absorption surface side of the array so that infrared light is uniformly irradiated upon the infrared light absorption surface of the array.

Figure 21:
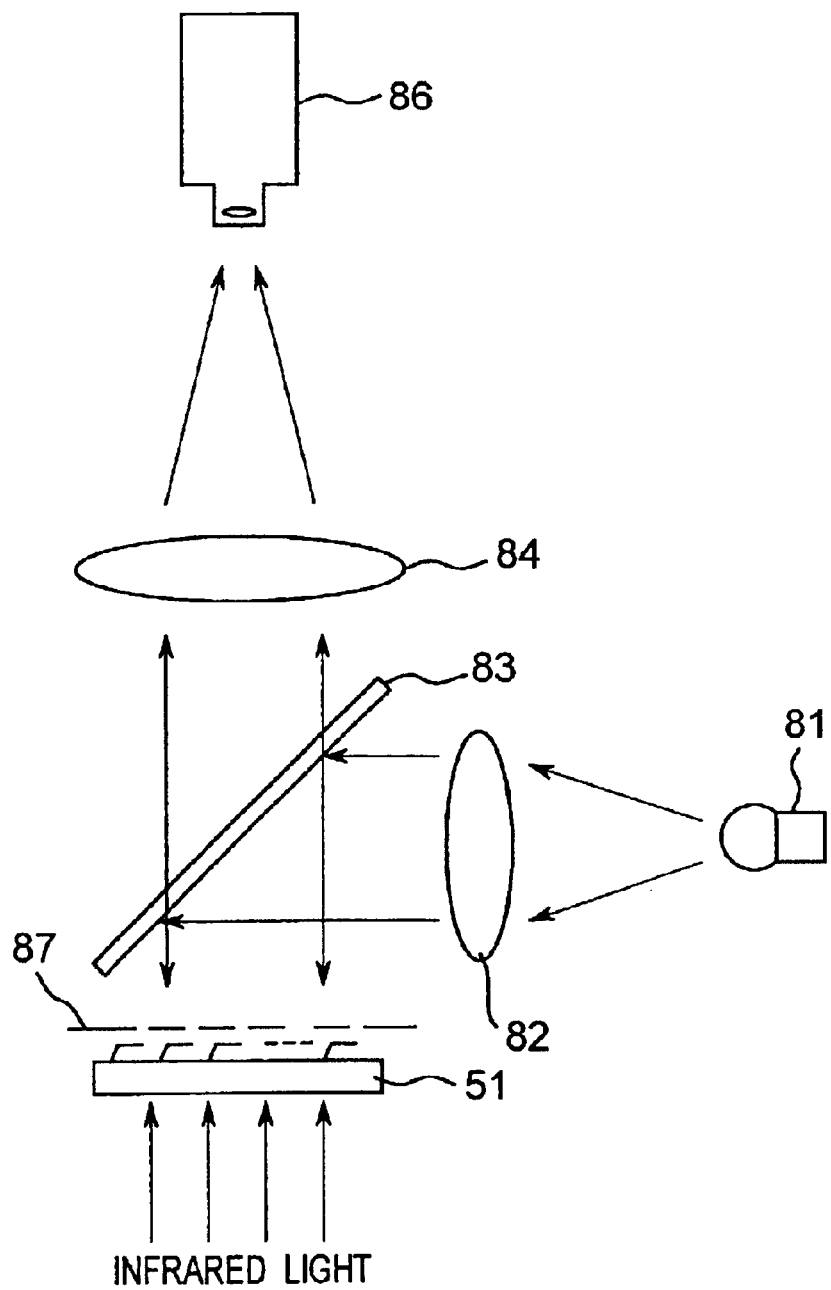
FIG. 21 is a schematic of the reading optical system.
Figure 22:
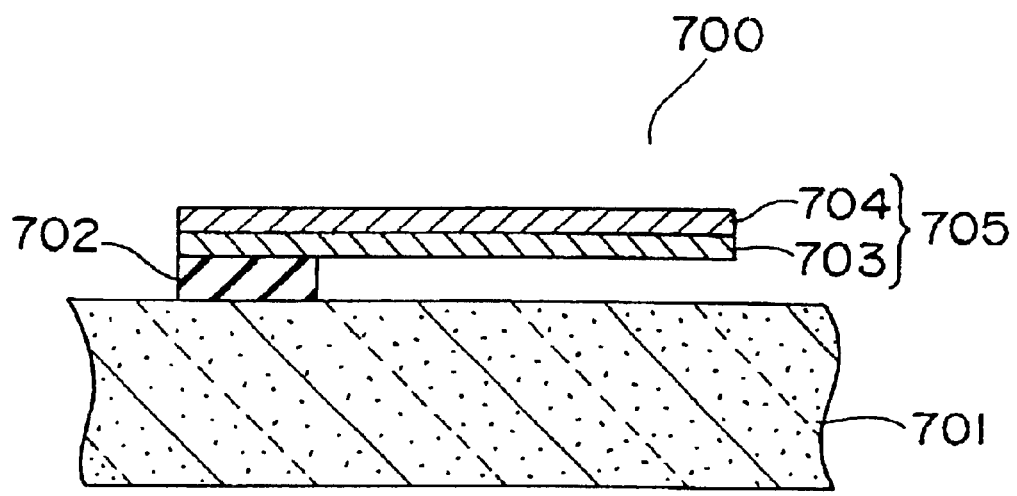
FIG. 22 is a cross sectional view of the conventional infrared light detector.
Figure 23:
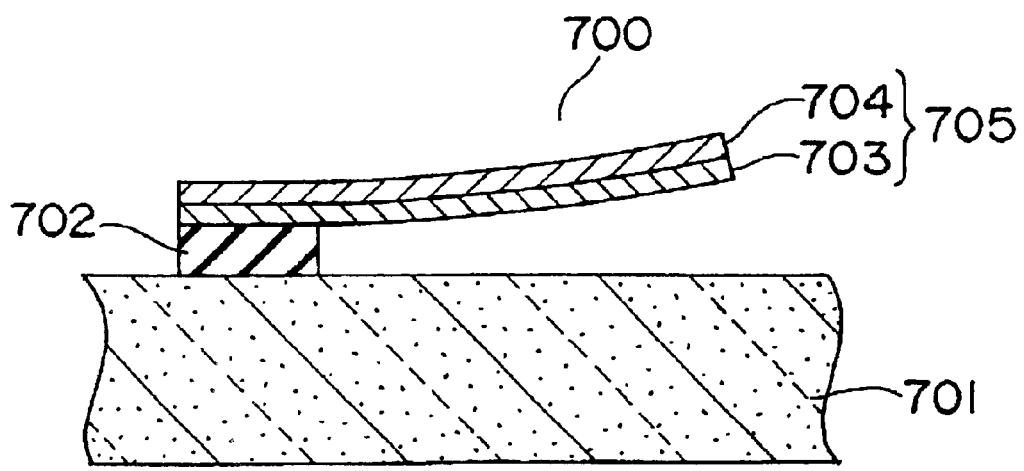
FIG. 23 is a cross sectional view of the conventional infrared light detector.

Meanwhile, a reading optical system 80 is disposed on the reflection surface side to reflect the reading light. Various types of structures may be used for the reading optical system 80. One of them is shown in FIG. 21. In the reading optical system 80 shown in FIG. 21, a laser diode 81 is used as a reading light source, and by means of a collimator lens 82 and a beam splitter 83, parallel light is incident vertically upon the reflection surface side of the chip 51 mounted with the infrared light detection array. A slit 87 is disposed in the vicinity of the reflection surface side of the array so that the reading light is irradiated only upon the reflection mirror 15 and the half mirror 16 are disposed in each pixel and other light except for the reading light transmitted by the half mirror 16 is blocked.

As a result, the reflected reading light is only the interference light caused by the reflection mirror 15 and the half mirror 16, an the modulation rate of reading light is improved. The light through the slit 87 is subjected to interference by the reflection mirror 15 and the half mirror 16 in accordance with the quantities of warping at the pixels, and passes through the slit 87 once again. Passing through the slit 87, the interference light is focused into an image a the lens 84 on the light receiving surface of the CCD camera 86, and thus, the interference light at each pixel is caught as a signal. The signal detected in this manner is used to correct the quantities of warping at the respective pixels by a method similar to that according to the first preferred embodiment.

A chip having corrected quantities of warping to be uniform at the respective pixels is mounted to the vacuum package 50 as in the first preferred embodiment, and further incorporated in the direct-vision infrared light detecting apparatus 90 (See FIGS. 7 and 8.).

As clearly described above, the infrared light detection arrays according to the embodiments do not have a fixed noise pattern.

Further, with the producing methods according to the embodiments, the reflection quantities at the respective pixels can be adjusted by an inexpensive method, and an infrared light detection array having no fixed pattern noise can be manufactured.

In addition, using the methods of producing infrared light detection arrays according to the embodiments, it is possible to adjust the reflection quantities without influencing reflection films.

What is claimed is:

1. An infrared light detection array with a plurality of infrared light detectors arranged on a substrate in the form of a matrix, said infrared light detectors each comprising:

a) a supporting leg fixed to said substrate at one end, having a laminated structure of an insulation layer and a wiring layer;

b) a heat insulation structure portion supported by said supporting leg, comprising an insulation layer having a first surface to serve as a surface of incidence for infrared light to impinge on and a second surface to serve as a surface of incidence for reading light to impinge on, a reflection film which is formed on said second surface of said insulation layer, and a resistor connected with said wiring layer, and as said supporting legs heated up to a detection temperature by said infrared light reversibly warp, said infrared light detectors change the reflection direction of said reading light impinging upon said reflection films, wherein said supporting legs non-reversibly warp, as said resistors carry a current through said wiring layers and said supporting legs are heated up to a temperature higher than said detection temperature.

2. An infrared light detection array according to claim 1, further comprising:
a plurality of row wires connected respectively with one ends of said resistors of said infrared light detectors arranged in a row direction;
a plurality of column wires connected respectively with other ends of said resistors of said infrared light detectors arranged in a column direction;
a vertical scanning circuit to select any desired row wire from said plurality of row wires;
a horizontal scanning circuit to select any desired column wire from said plurality of column wires; and
controlling elements connected in series with said resistors and included in said infrared light detectors,
wherein said resistors carry a current using said controlling elements of said infrared light detectors with rows and columns selected by said vertical scanning circuit and said horizontal scanning circuit.

3. An infrared light detection array according to claim 2, characterized in that said controlling element is selected out from a transistor and a diode.

4. An infrared light detection array according to claim 1, characterized in that a main component of said resistors is an element selected from a group including titanium, tantalum, titanium nitride and tantalum nitride.

5. An infrared light detection array according to claim 1, characterized in that said resistors are diodes.

6. An infrared light detection array according to claim 5, characterized in that said diodes are comprised of a pn junction diode joining an n-type silicon layer containing boron as an impurity with a p-type silicon layer containing arsenic or antimony as an impurity.

7. An infrared light detection array according to claim 5, further comprising:
a plurality of row wires connected respectively with one ends of said diodes of said infrared light detectors arranged in a row direction;
a plurality of column wires connected respectively with other ends of said diodes of said infrared light detectors arranged in a column direction;
a vertical scanning circuit to select any desired row wire from said plurality of row wires;
a horizontal scanning circuit to select any desired column wire from said plurality of column wires,
wherein said diodes of said infrared light detectors with rows and columns selected by said vertical scanning circuit and said horizontal scanning circuit carry a current.

8. An infrared light detection array according to claim 1, characterized in that said insulation layers and said wiring layers forming said supporting legs are comprised of ceramic layers and metal layers having different thermal expansion coefficients from each other.

9. An infrared light detection array according to claim 8, characterized in that said ceramic layers include one layer selected from a silicon oxide layer, a silicon nitride layer and a silicon oxynitride film,
and that said metal layers have an element selected from a group including titanium, titanium nitride, aluminum, tungsten, gold, copper and platinum as a main component.

10. An infrared light detection array according to claim 1, characterized in that insulation plates supported by supporting columns are disposed on said second surfaces of said insulation layers to be approximately parallel to said insulation layers, and that said reflection films are formed on said insulation plates.

11. An infrared light detection array according to claim 1, characterized in that said heat insulation structure portions include infrared absorbing films on the first surface side to said resistors, and the sheet resistance of said infrared absorbing films is from about 100 $\Omega/\square$ to about 500 $\Omega/\square$.

12. An infrared light detection array according to claim 11, characterized in that the optical film thickness of said insulation layers between said infrared absorbing films and said reflection films included in said heat insulation structure portions is approximately 2.5 $\mu$m to infrared light on a wavelength of 10 $\mu$m.

13. An infrared light detection array with a plurality of infrared light detectors arranged on a substrate in the form of a matrix, said infrared light detectors each comprising:
a) a supporting leg fixed to said substrate on one end, having a laminated structure of an insulation layer and a wiring layer;
b) a heat insulation structure portion supported by said supporting leg, comprising an insulation layer having a first surface for infrared light to impinge upon and a second surface for reading light to impinge upon, a half-mirror layer to transmit a portion of said reading light but reflect the other portion of said reading light, and a resistor connected with said wiring layer; and
c) a mirror layer disposed on said substrate to reflect said reading light transmitted through said half-mirror layer and causes said reading light reflected by said half-mirror layer to interfere with said reading light reflected by said mirror layer to thereby create interference light,
and as said supporting legs heated up to a detection temperature by said infrared light reversibly warp, said infrared light detectors change the light intensity of said interference light,
wherein said supporting legs non-reversibly warp, as said resistors carry a current through said wiring layers and said supporting legs are heated up to a temperature which is higher than said detection temperature.

14. A method of producing an infrared light detection array with a plurality of infrared light detectors arranged on a substrate in the form of a matrix, comprising:
a step of preparing a substrate;
a step of depositing a sacrificial layer on said substrate;
a step of forming insulation layers to define heat insulation structure portion areas and supporting leg areas on said sacrificial layer;
a resistor forming step of forming resistors in said heat insulation structure portion areas of said insulation layers;
a reflection film forming step of forming reflection films on said resistors;
an annealing step of heating said substrate forming said reflection films to a predetermined annealing temperature;
a step of forming a wiring layer connected with said resistors on said supporting leg areas of said insulation layers after said annealing step; and
a step of removing said sacrificial layer and producing said infrared light detectors with said heat insulation structure portions supported on said substrate by said supporting legs comprised of said insulation layers and said wiring layers, wherein said method further comprising a correction step of causing said resistors included in said infrared light detectors to carry a current after said infrared light detectors are formed and heating up said resistors to a temperature lower than said annealing temperature, so that said supporting legs non-reversibly warp and the supporting angles of said reflection films with respect to said substrate become approximately uniform among all of said infrared light detectors.

15. A method according to claim 14, characterized in that said resistor forming step comprises a step of forming a polycrystalline silicon film on said insulation layers, implanting n-type impurities and p-type impurities into said polycrystalline silicon film and forming said resistors from pn junction diodes.

16. A method according to claim 14, characterized in that said reflection film forming step comprises:

- a step of depositing a further sacrificial layer on said heat insulation structure portion areas of said insulation layers;
- a step of forming said reflection films on said sacrificial layer; and
- a step of removing said sacrificial layer and forming said reflection films supported on said heat insulation structure portion areas of said insulation layers.

17. A method according to claim 14, characterized in that said correction step comprises:

- a step of approximately uniformly irradiating infrared light from the infrared incident side of said infrared light detection array;
- a step of irradiating reading light upon said reflection films of said infrared light detectors included in said infrared light detection array;
- a step of detecting reflection light generated as said reading light is reflected by said reflection films; and
- a step of heating said resistors and warping said supporting legs non-reversibly in such a manner that the detected intensities of light become approximately uniform among said infrared light detectors.

18. A method according to claim 17, characterized in that said correction step comprises a pulsed current step of applying pulses to said resistor of one of said infrared light detectors, and terminating the pulsed current to said infrared light detectors at the point that the intensity of said reflection light reaches a predetermined intensity while the said pulsed current is not carried.

* * * * *